United States Patent
Sukla et al.

(10) Patent No.: US 10,930,307 B2
(45) Date of Patent: Feb. 23, 2021

(54) PIEZOELECTRIC-BASED LOCKING OF ACTUATOR ELEVATOR MECHANISM FOR COLD STORAGE DATA STORAGE DEVICE

(71) Applicant: Western Digital Technologies, Inc., San Jose, CA (US)

(72) Inventors: Bikash Sukla, Sunnyvale, CA (US); David K. Myers, Campbell, CA (US); Jon M. Garbarino, San Jose, CA (US); Garold W. Plonczak, Livermore, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/731,740

(22) Filed: Dec. 31, 2019

(65) Prior Publication Data

US 2020/0227077 A1    Jul. 16, 2020

Related U.S. Application Data

(60) Provisional application No. 62/792,336, filed on Jan. 14, 2019.

(51) Int. Cl.
G11B 5/48    (2006.01)

(52) U.S. Cl.
CPC .................. G11B 5/4813 (2013.01)

(58) Field of Classification Search
None
See application file for complete search history.

(56) References Cited

U.S. PATENT DOCUMENTS

| 3,134,097 | A |   | 5/1964 | Stevens et al. | |
|-----------|---|---|--------|----------------|---|
| 3,172,082 | A |   | 3/1965 | Dirks | |
| 3,505,060 | A |   | 3/1970 | Goddard et al. | |
| 3,867,723 | A | * | 2/1975 | Penfold ................ | G11B 17/02 |
|           |   |   |        |                | 360/98.03 |
| 3,940,794 | A | * | 2/1976 | Griffiths ............... | G11B 5/5521 |
|           |   |   |        |                | 360/98.03 |

(Continued)

FOREIGN PATENT DOCUMENTS

| JP | 55129929 A | * | 10/1980 | ............. | G11B 5/012 |
|----|------------|---|---------|--------------|------------|
| JP | 60111317 A | * | 6/1985  | ............. | G11B 5/592 |

(Continued)

OTHER PUBLICATIONS

International Search Report and Written Opinion for counterpart PCT/US2020/012991, dated May 7, 2020, 10 pages, ILPO.

(Continued)

*Primary Examiner* — William J Klimowicz
(74) *Attorney, Agent, or Firm* — John D. Henkhaus

(57) ABSTRACT

An approach to a reduced-head hard disk drive (HDD) involves an actuator elevator assembly for moving an actuator assembly along at least one support feature to provide a head slider access to at least two different disk media of a disk stack. The HDD includes a piezoelectric-based locking mechanism, including at least one piezoelectric actuator, movably coupled with the support feature, such that actuation of the actuator either locks or unlocks the locking mechanism relative to the support feature. When unlocked, the actuator assembly can be translated along the length of the disk stack via the actuator elevator assembly.

17 Claims, 16 Drawing Sheets

(56) References Cited

U.S. PATENT DOCUMENTS

| | | | | |
|---|---|---|---|---|
| 3,975,769 | A * | 8/1976 | King | G11B 5/5521 360/98.02 |
| 4,148,084 | A * | 4/1979 | Gyi | G11B 17/021 360/135 |
| 4,175,275 | A * | 11/1979 | Schaefer | G11B 5/4833 360/130.1 |
| 4,566,087 | A * | 1/1986 | Kraft | G11B 7/0037 369/30.29 |
| 4,689,516 | A * | 8/1987 | Yokoyama | B23Q 1/28 310/317 |
| 6,242,850 | B1 * | 6/2001 | Slutskiy | H02N 2/0065 310/323.02 |
| 6,320,714 | B1 | 11/2001 | Moon | G11B 5/012 324/212 |
| 6,373,649 | B1 * | 4/2002 | Walker | G11B 5/012 360/67 |
| 6,473,269 | B1 * | 10/2002 | Ganor | G11B 5/54 360/256.3 |
| 6,693,773 | B1 | 2/2004 | Sassine | |
| 7,813,078 | B1 | 10/2010 | Gleason et al. | |
| 7,986,491 | B2 | 7/2011 | Albrecht et al. | |
| 8,112,580 | B2 * | 2/2012 | Bandic | G11B 5/5521 360/75 |
| 8,208,215 | B2 * | 6/2012 | Molaro | G11B 17/021 360/55 |
| 8,553,367 | B1 * | 10/2013 | Foisy | G11B 5/5569 360/265.7 |
| 8,824,094 | B1 | 9/2014 | Furlong et al. | |
| 8,958,172 | B1 | 2/2015 | Hansen | |
| 8,958,173 | B1 | 2/2015 | Hirano et al. | |
| 9,025,277 | B1 | 5/2015 | Hirano | |
| 9,183,862 | B1 | 11/2015 | Shah et al. | |
| 9,218,833 | B1 | 12/2015 | Shah et al. | |
| 9,552,835 | B1 | 1/2017 | Tamayo et al. | |
| 9,704,521 | B1 | 7/2017 | Shah et al. | |
| 10,269,380 | B1 * | 4/2019 | Sun | G11B 17/021 |
| 2006/0002028 | A1 | 1/2006 | Nayar et al. | |
| 2008/0055773 | A1 | 3/2008 | Nigam | |
| 2009/0279199 | A1 | 11/2009 | Zhang | |
| 2010/0091408 | A1 * | 4/2010 | Albrecht | G11B 17/26 360/244 |
| 2012/0002328 | A1 | 1/2012 | Aoki et al. | |
| 2019/0333533 | A1 * | 10/2019 | Mendonsa | G11B 5/012 |
| 2020/0027477 | A1 * | 1/2020 | Garbarino | G11B 5/54 |
| 2020/0027479 | A1 * | 1/2020 | Myers | H02K 37/10 |
| 2020/0027480 | A1 * | 1/2020 | Myers | G11B 5/55 |

FOREIGN PATENT DOCUMENTS

| | | | | |
|---|---|---|---|---|
| JP | 62288911 | A * | 12/1987 | G03F 7/707 |
| JP | 02240801 | A * | 9/1990 | |
| JP | 11273277 | A * | 10/1999 | |
| JP | 2000011567 | A * | 1/2000 | |

OTHER PUBLICATIONS

International Business Machines Corporation, IBM Customer Engineering Manual of Instruction, RAMAC 305, copyright 1958, 1959 by International Business Machines Corporation, 253 pages.

* cited by examiner

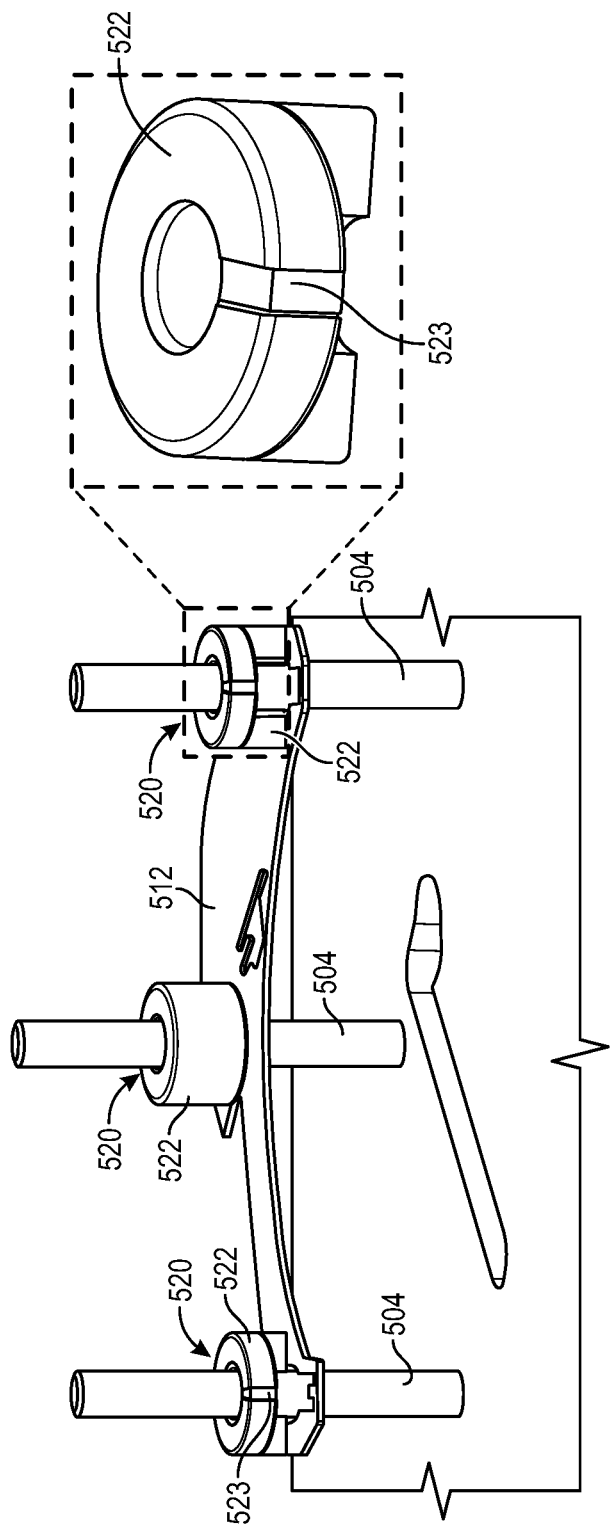

US 10,930,307 B2

PIEZOELECTRIC-BASED LOCKING OF ACTUATOR ELEVATOR MECHANISM FOR COLD STORAGE DATA STORAGE DEVICE

CROSS-REFERENCE TO RELATED APPLICATIONS

This application claims the benefit of priority to U.S. Provisional Patent Application Ser. No. 62/792,336, filed Jan. 14, 2019; the entire content of which is incorporated by reference for all purposes as if fully set forth herein.

FIELD OF EMBODIMENTS

Embodiments of the invention may relate generally to a reduced-head hard disk drive having an actuator elevator mechanism to provide read-write access to the recording disks and particularly to approaches to locking and unlocking such a mechanism.

BACKGROUND

There is an increasing need for archival storage. Tape is a traditional solution for data back-up, but is very slow to access data. Current archives are increasingly "active" archives, meaning some level of continuing random read data access is required. Traditional hard disk drives (HDDs) can be used but cost may be considered undesirably high. Other approaches considered may include HDDs with extra large diameter disks and HDDs having an extra tall form factor, with both requiring large capital investment due to unique components and assembly processes, low value proposition in the context of cost savings, and barriers to adoption in the marketplace due to uniquely large form factors, for example.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 5C is a perspective view illustrating a piezoelectric-based actuator arm platform elevator locking mechanism, according to an embodiment;

DESCRIPTION

Approaches to a multi-disk hard disk drive having an actuator elevator mechanism and an associated locking mechanism(s) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a multi-disk, reduced read-write head, digital data storage device (DSD) such as a hard disk drive (HDD). Thus, in accordance with an embodiment, a plan view illustrating a conventional HDD 100 is shown in FIG. 1 to aid in describing how a conventional HDD typically functions.

Figure 1:
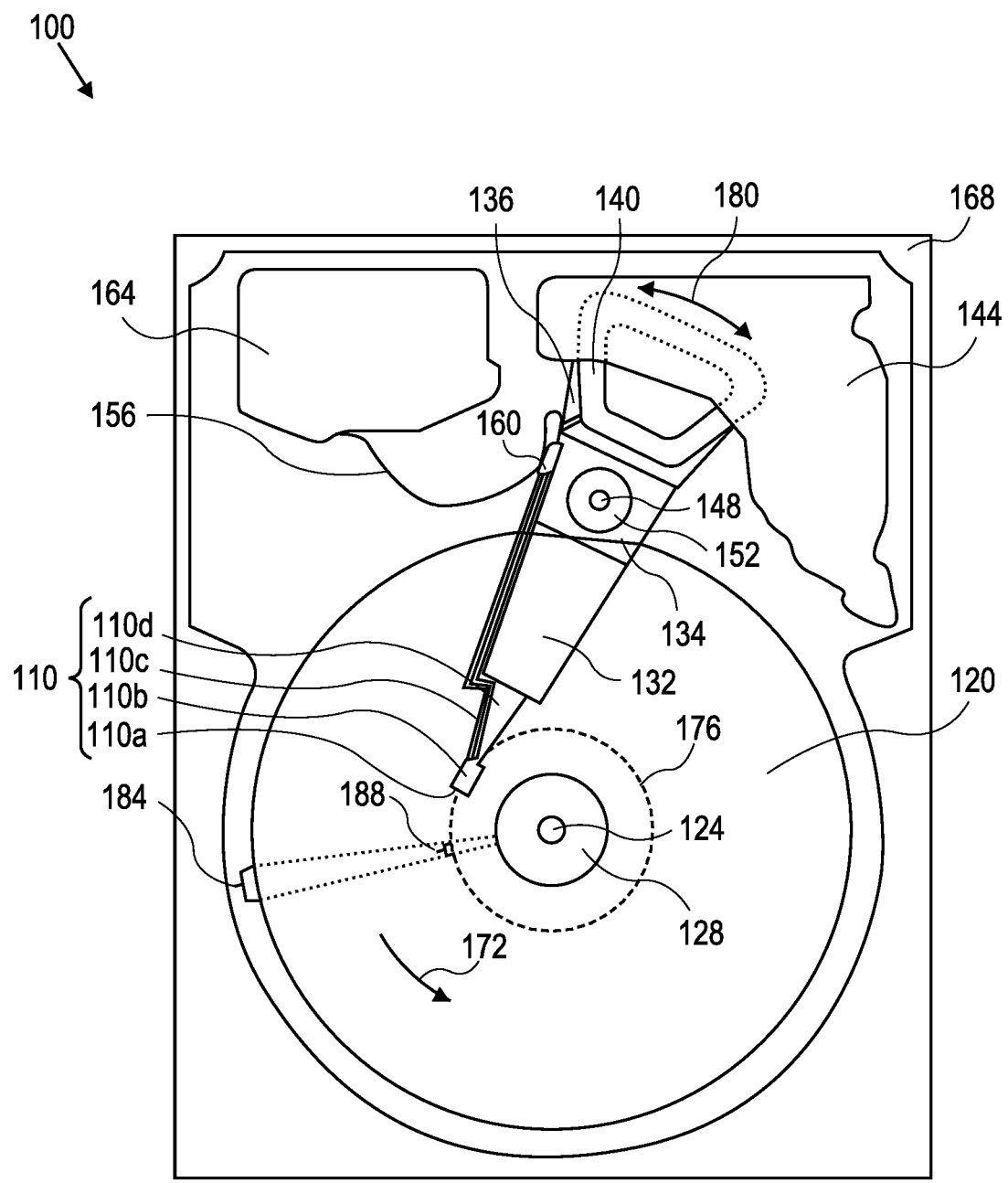
FIG. 1 is a plan view illustrating a hard disk drive, according to an embodiment.

FIG. 1 is a plan view illustrating a hard disk drive, according to an embodiment. Components of a hard disk drive (HDD) 100 include a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Recall that there is an increasing need for cost effective "active" archival storage (also referred to as "cold storage"), preferably having a conventional form factor and utilizing many standard components. One approach involves a standard hard disk drive (HDD) form factor (e.g., a 3.5" form factor) and largely common HDD architecture, with n disks in one rotating disk stack, but containing fewer than 2n read-write heads, according to embodiments. Such a storage device may utilize an articulation mechanism that can move the heads to mate with the different disk surfaces (for a non-limiting example, only 2 heads but 5+ disks for an air drive or 8+ disks for a He drive), where the primary cost savings may come from eliminating the vast majority of the heads in the drive. Generally, the term "reduced-head HDD" is used herein to refer to an HDD in which the number of read-write heads is less than the number of magnetic-recording disk media surfaces.

For a reduced-head HDD, a very thin structure (e.g., the read-write head stack assembly, or "HSA") needs to be moved while keeping perpendicular to the axis on which it is moving. That structure also needs to maintain sufficient stiffness for structural and resonance control. One approach may involve an actuator subsystem comprising a low profile ball screw cam assembly, which transforms rotary motion into linear motion, with a motor disposed therein to form an actuator elevator subassembly, which is disposed within the actuator pivot and pivot bearing of the actuator subsystem (e.g., the "pivot cartridge") and is configured to vertically translate at least one actuator arm (see, e.g., arm 132 of FIG. 1) along with a respective HGA (see, e.g., HGA 110 of FIG. 1). Approaches to such an actuator subsystem are described in U.S. patent application Ser. No. 16/513,611 entitled "Low-Profile Ball Screw Cam Elevator Mechanism For Cold Storage Data Storage Device" and published as application Publication No. US-2020-0027479-A1, the entire content of which is hereby incorporated by reference for all purposes as if fully set forth herein. Such an actuator subsystem for a reduced-head HDD may comprise two actuator arm assemblies each with a corresponding HGA (e.g., a modified HSA, in which the actuator arm assemblies translate vertically, or elevate, while the VCM coil may be fixed in the vertical direction) housing a corresponding read-write head (see, e.g., read-write head 110*a* of FIG. 1). Another approach may involve implementation of an elevator mechanism comprising a movable platform used for housing a complete actuator assembly (e.g., a conventional HSA), and for example a load/unload ramp assembly, and for example some electronics and electrical interconnection components, and the like, and for collectively translating or elevating such sub-components.

Piezoelectric-Based Actuator Arm Locking Mechanisms

Figure 2A:
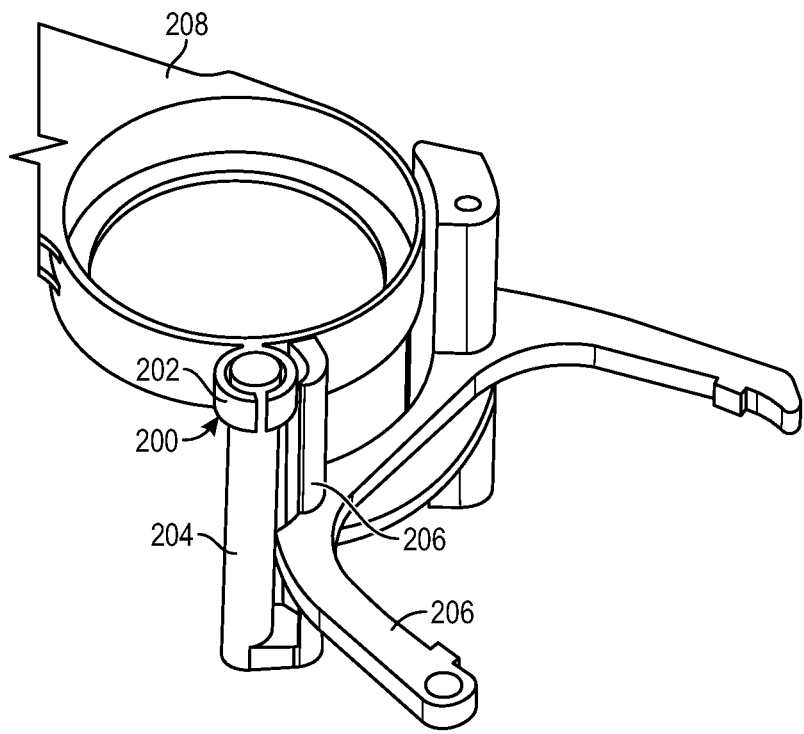
FIG. 2A is a perspective view illustrating a piezoelectric-based circular clamp actuator arm locking mechanism, according to an embodiment.
Figure 2B:
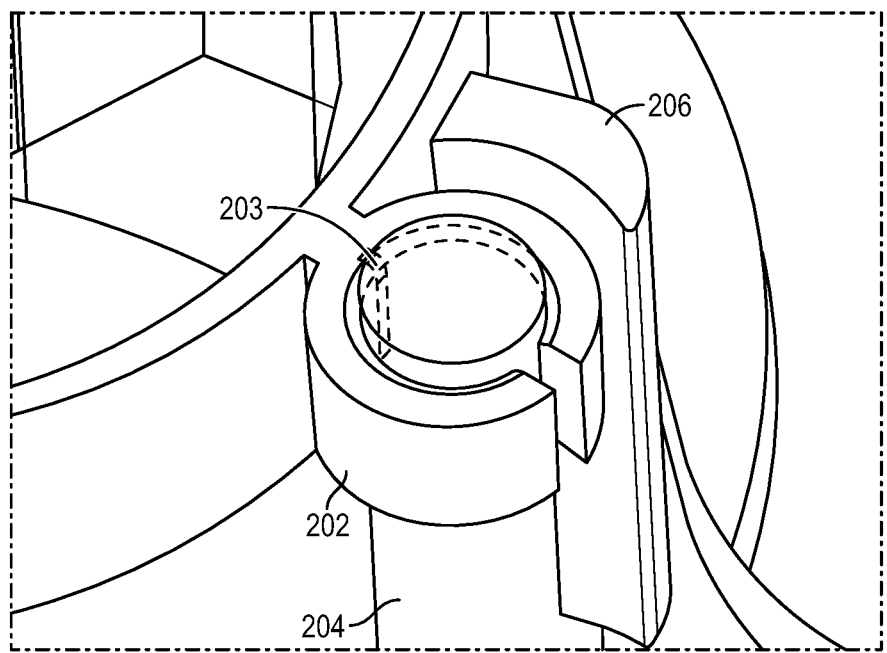
FIG. 2B is a perspective view illustrating the circular clamp locking mechanism of FIG. 2A, according to an embodiment.
Figure 2C:
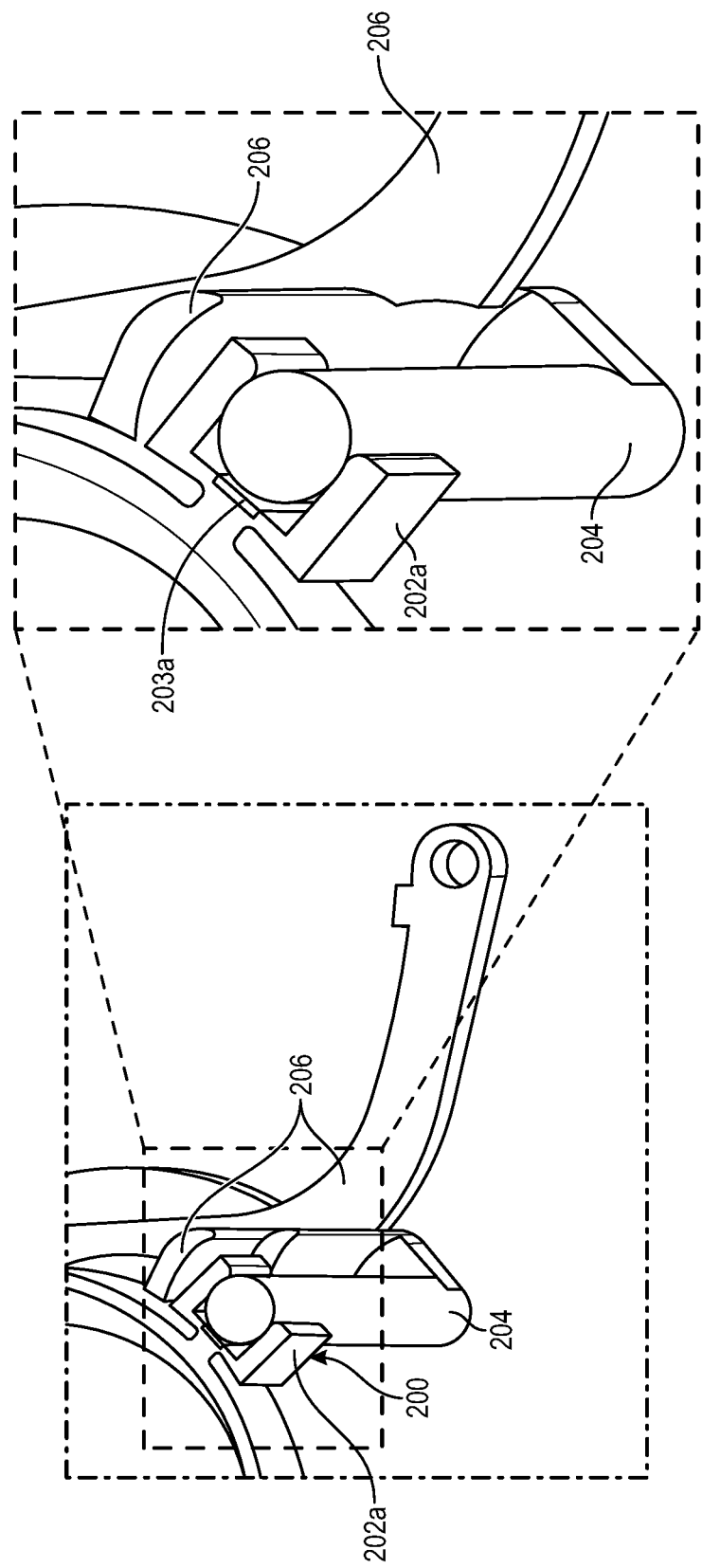
FIG. 2C is a perspective view illustrating a U-clamp locking mechanism for the arrangement of FIG. 2A, according to an embodiment.

FIG. 2A is a perspective view illustrating a piezoelectric-based circular clamp actuator arm locking mechanism, FIG. 2B is a perspective view illustrating the circular clamp locking mechanism of FIG. 2A, and FIG. 2C is a perspective view illustrating a U-clamp locking mechanism for the arrangement of FIG. 2A, all according to embodiments. FIGS. 2A-2C collectively illustrate a shaft-style lock/unlock mechanism, which unlocks to allow a head-stack assembly (HSA) (e.g., actuator arm, suspension, read-write head, etc.) to translate vertically when piezoelectric-based actuators (or "motors") are actuated.

A piezoelectric-based locking mechanism 200 comprises at least one piezoelectric actuator 203 movably coupled to a support feature, such that actuation of the actuator 203 either locks or unlocks the locking mechanism 200 relative to the support feature. For context, a reduced-head hard disk drive (HDD) in which this embodiment may be implemented further comprises an actuator assembly comprising a voice coil (coil not shown here; see, e.g., coil 140 of FIG. 1), a coil support structure 206 (e.g., similar to armature 136 of FIG. 1), and an actuator arm 208 (e.g., similar to arm 132 of FIG. 1), and some form of actuator elevator assembly configured to move the actuator assembly along at least one support feature to access at least two disk media of a disk stack (not shown here; see, e.g., recording medium 120 of FIG. 1). For example, the aforementioned ball screw cam assembly or movable platform may function as a suitable actuator elevator assembly, according to embodiments.

Generally, the piezoelectric effect refers to the ability of certain materials to generate an electric charge in response to applied mechanical stress and, conversely, generate stress when an electric field is applied, which can operate to expand and compress the material via manipulation of the underlying crystalline structure of the material. Hence, depending on the orientation of the polarization of the material and the applied voltage, a piezoelectric actuator may be configured to expand or contract when an electric field is applied, i.e., when actuated. A typical manufactured/synthetic type of piezoelectric material is a ceramic, lead zirconate titanate ($Pb[Zr_xTi_{1-x}]O_3$ with $0 \leq x \leq 1$), which is commonly referred to as "PZT". According to embodiments throughout this description, the material used for each of the described piezoelectric actuators is PZT. However, each embodiment is not necessarily limited to that specific material, as other piezoelectric materials could be utilized.

With reference to FIG. 2B and according to an embodiment, the support feature comprises a shaft 204 coupled with the coil support structure 206, and along which the actuator arm 208 moves to access various disk media. For example, the actuator assembly translates or elevates along the shaft 204, such as vertically in the scenario in which the shaft 204 is positioned vertically. According to a related embodiment, the locking mechanism 200 comprises a C-shaped clamp 202 coupled with the actuator arm 208, and positioned around at least part of the shaft 204, where the C-shaped clamp 202 comprises the at least one piezoelectric actuator 203 which is positioned to open the clamp 202 in response to actuation of the actuator 203. Once the clamp 202 is opened and released from the friction with the shaft 204, the actuator assembly is free to translate along the shaft 204 under the driving force of the actuator elevator assembly. While this embodiment is described as expanding when actuated, thus opening the clamp 202 in which the piezoelectric actuator 203 is "embedded", the piezoelectric actuator 203 could be reversely configured to be open when at rest with no electricity applied and, therefore, close the clamp 202 when actuated, based on implementation requirements/goals.

With reference to FIG. 2C and according to an embodiment, the locking mechanism 200 comprises a U-shaped clamp 202a coupled with the actuator arm 208, and positioned around at least part of the shaft 204, where the U-shaped clamp 202a comprises the at least one piezoelectric actuator 203a which is positioned to open the clamp 202a in response to actuation of the actuator 203a. Once the clamp 202a is opened and released from the friction with the shaft 204, the actuator assembly is free to translate along the shaft 204 under the driving force of the actuator elevator assembly. Similarly to the C-clamp 202 and piezoelectric actuator 203, while this embodiment is described as expanding when actuated, thus opening the clamp 202a in which the piezoelectric actuator 203a is "embedded", the piezoelectric actuator 203a could be reversely configured to be open when at rest with no electricity applied and, therefore, close the clamp 202a when actuated, based on implementation requirements/goals.

Figure 3B:
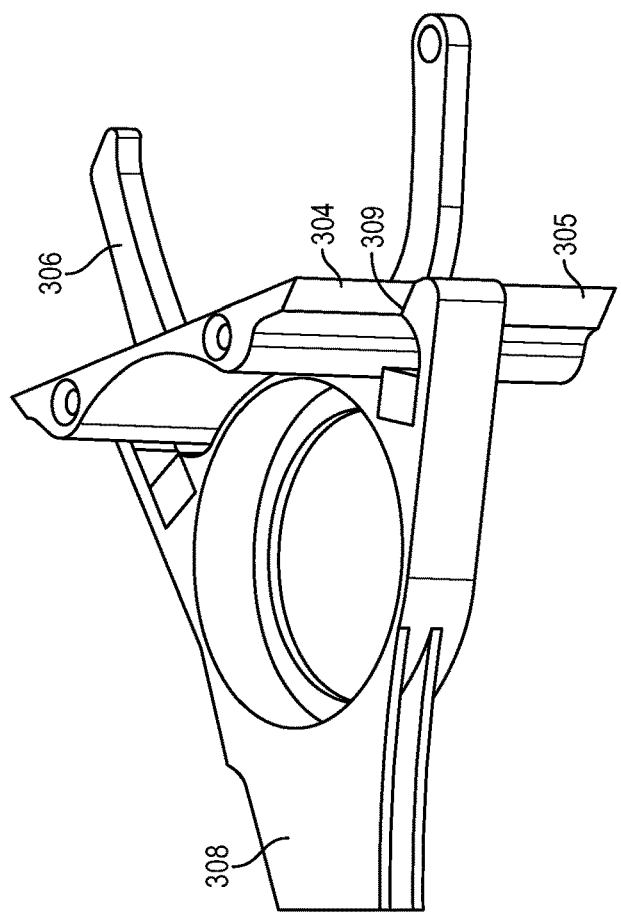
FIG. 3B is a perspective view illustrating the actuator-to-coil locking mechanism of FIG. 3A, according to an embodiment.
Figure 3A:
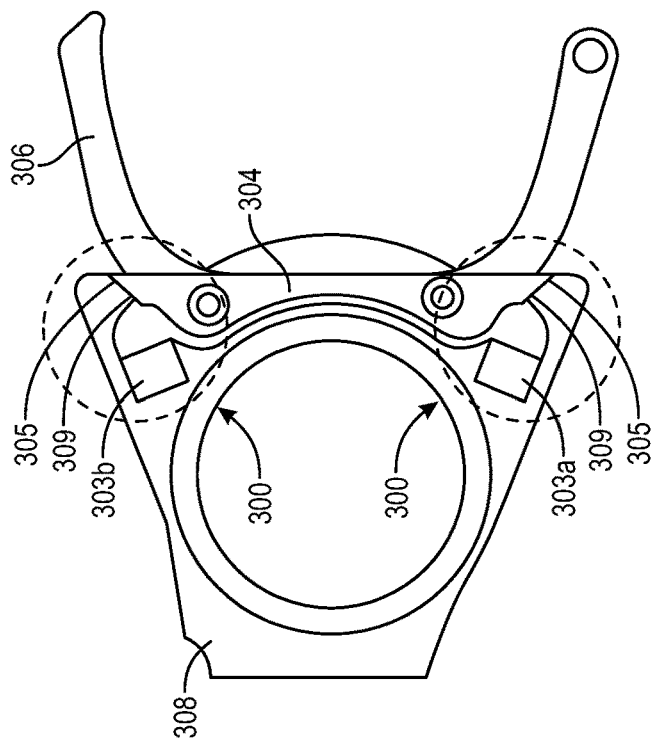
FIG. 3A is a plan view illustrating a piezoelectric-based actuator-to-coil actuator arm locking mechanism, according to an embodiment.

FIG. 3A is a plan view illustrating a piezoelectric-based actuator-to-coil actuator arm locking mechanism, and FIG. 3B is a perspective view illustrating the actuator-to-coil locking mechanism of FIG. 3A, both according to embodiments. Thus, FIGS. 3A-3C collectively illustrate an actuator-to-coil lock/unlock mechanism, which unlocks to allow a head-stack assembly (HSA) (e.g., actuator arm, suspension, read-write head, etc.) to translate vertically when piezoelectric-based actuators (or "motors") are actuated.

A piezoelectric-based locking mechanism 300 comprises at least one piezoelectric actuator 303 movably coupled to a support feature, such that actuation of the actuator 303 either locks or unlocks the locking mechanism 300 relative to the support feature. For context, a reduced-head hard disk drive (HDD) in which this embodiment may be implemented further comprises an actuator assembly comprising a voice coil (coil not shown here; see, e.g., coil 140 of FIG. 1), a coil support structure 306 (e.g., similar to armature 136 of FIG. 1), and an actuator arm 308 (e.g., similar to arm 132 of FIG. 1), and some form of actuator elevator assembly configured to move the actuator assembly along at least one support feature to access at least two disk media of a disk stack (not shown here; see, e.g., recording medium 120 of FIG. 1). For example, the aforementioned ball screw cam assembly or movable platform may function as a suitable actuator elevator assembly, according to embodiments.

According to an embodiment, the support feature comprises a slider structure 304 coupled with the coil support structure 306, and comprising a slider surface 305 movably mating with a surface 309 of the actuator arm 308, and along which the actuator arm 308 moves to access various disk media. For example, the actuator assembly translates or elevates along the slider structure 304, such as vertically in the scenario in which the slider structure 304 is positioned vertically. According to a related embodiment, the locking mechanism 300 comprises at least one piezoelectric actuator 303a (and 303b, with two shown here, according to an embodiment) coupled with the actuator arm 308, and positioned to release the surface 309 of the actuator arm 308 from contact with the slider surface 305 in response to actuation of the actuator 303a and/or 303b. Once the surfaces 305/309 are released from the friction with each other, the actuator assembly is free to translate along the slider structure 304 under the driving force of the actuator elevator assembly. Note that the contact surfaces 305, 309 may vary from implementation to implementation. That is, the contact surface 305, 309 planes may be coincident to or with the actuator assembly pivot center, e.g., as depicted in FIGS. 3A-3B, according to an embodiment. Alternatively, the contact surface 305, 309 planes on both sides of the locking mechanism (in scenarios in which two actuators 303a, 303b are used) may be parallel to each other (e.g., both "left" side surfaces parallel to both "right" side surfaces), which may enable higher tolerance machining operation(s) in manufacturing.

Figure 4A:
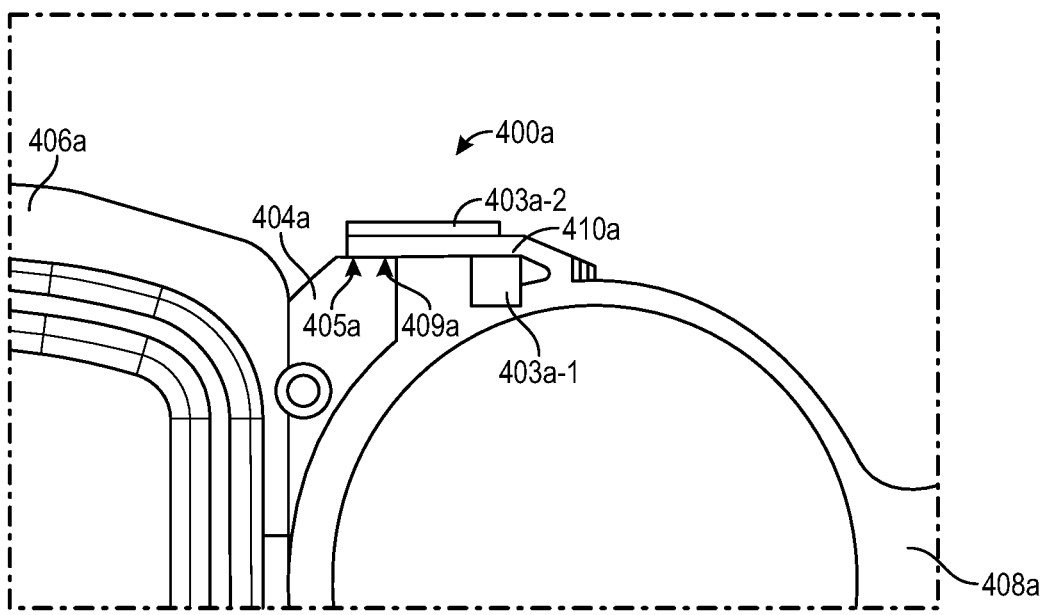
FIG. 4A is a plan view illustrating a piezoelectric-based dual-motor actuator arm locking mechanism, according to an embodiment.
Figure 4B:
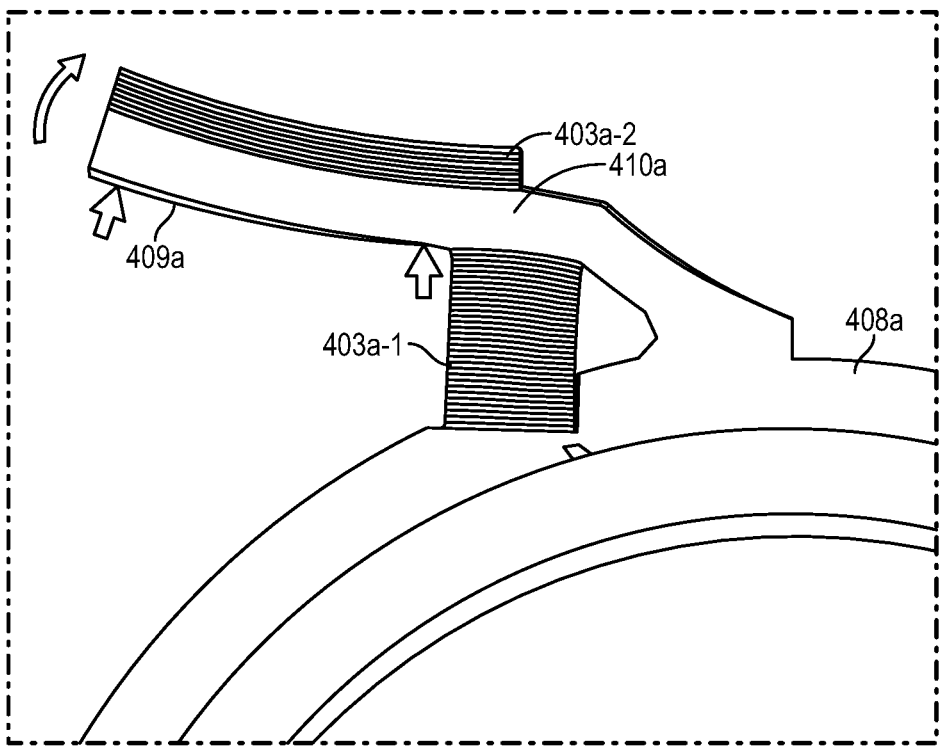
FIG. 4B is a side view illustrating the dual-motor locking mechanism of FIG. 4A in an actuated state, according to an embodiment.

FIG. 4A is a plan view illustrating a piezoelectric-based dual-motor actuator arm locking mechanism, and FIG. 4B is a side view illustrating the dual-motor locking mechanism of FIG. 4A in an actuated state, both according to embodiments. Thus, FIGS. 4A-4B collectively illustrate a dual-motor lock/unlock mechanism, which unlocks to allow a head-stack assembly (HSA) (e.g., actuator arm, suspension, read-write head, etc.) to translate vertically when piezoelectric-based actuators (or "motors") are actuated.

A piezoelectric-based locking mechanism 400a comprises a piezoelectric linear actuator 403a-1 and a piezoelectric bending actuator 403a-2 coupled to a support feature, such that actuation of the actuators 403a-1, 403a-2 can be implemented to either lock or unlock the locking mechanism 400a relative to the support feature. For context, a reduced-head hard disk drive (HDD) in which this embodiment may be implemented further comprises an actuator assembly comprising a voice coil (coil not shown here; see, e.g., coil 140 of FIG. 1), a coil support structure 406a (e.g., similar to armature 136 of FIG. 1), and an actuator arm 408a (e.g., similar to arm 132 of FIG. 1), and some form of actuator elevator assembly configured to move the actuator assembly along at least one support feature to access at least two disk media of a disk stack (not shown here; see, e.g., recording medium 120 of FIG. 1). For example, the aforementioned ball screw cam assembly or movable platform may function as a suitable actuator elevator assembly, according to embodiments.

According to an embodiment, the support feature comprises a slider structure 404a constituent to or coupled with the coil support structure 406a, and comprising a slider surface 405a movably mating with a surface 409a of the actuator arm 408a, and along which the actuator arm 408a moves to access various disk media. For example, the actuator assembly translates or elevates along the slider structure 404a, such as vertically in the scenario in which the slider structure 404a is positioned vertically. As introduced, the locking mechanism 400a comprises a piezoelectric linear actuator 403a-1, which is configured to contract and expand linearly (e.g., according to the orientation of the polarity and electric field of the piezoelectric material layers), and a piezoelectric bending actuator 403a-2, which is configured to contract and expand (e.g., according to the orientation of the polarity and electric field of the piezoelectric material layers) to bend a lock arm 410a extending from the main actuator arm 408a. Each of the linear actuator 403a-1 and the bending actuator 403a-2 is coupled with (e.g., bonded to) the lock arm 410a extending from the main actuator arm 408a, with each actuator 403a-1, 403a-2 configured and positioned to deflect the lock arm 410a (e.g., as depicted by block arrows) and thereby release the surface 409a of the lock arm 410a from contact with the slider surface 405a of the slider structure 404a in response to actuation of the actuators 403a-1, 403a-2. Once the surfaces 405a/409a are released from the friction with each other, the actuator assembly is free to translate along the slider structure 404a under the driving force of the actuator elevator assembly. This arrangement is such that the linear actuator 403a-1 initially bends the lock arm 410a utilizing high leverage geometry to initiate a high slope on the end of the lock arm 410a, where the bending actuator 403a-2 is located. The bending actuator 403a-2 continues deflecting the end of the lock arm 410a at its end that contacts the slider structure 404a of the coil support structure 406a, which is all to release the surface 409a from the surface 405a.

Figure 4C:
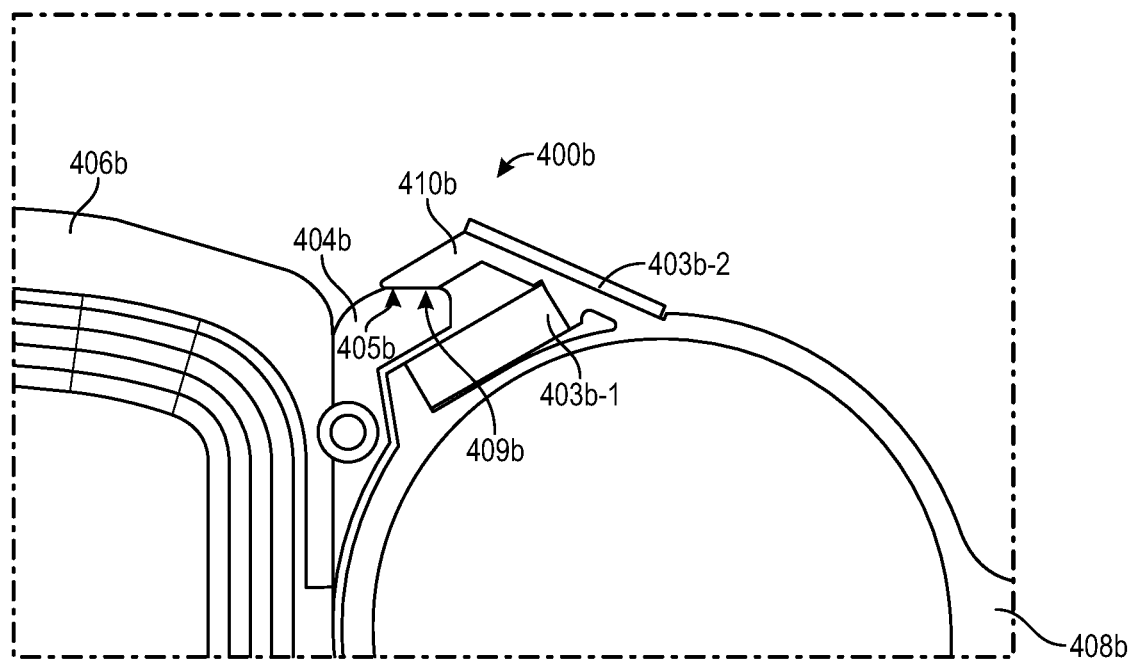
FIG. 4C is a plan view illustrating a piezoelectric-based dual-motor actuator arm locking mechanism, according to an embodiment.
Figure 4D:
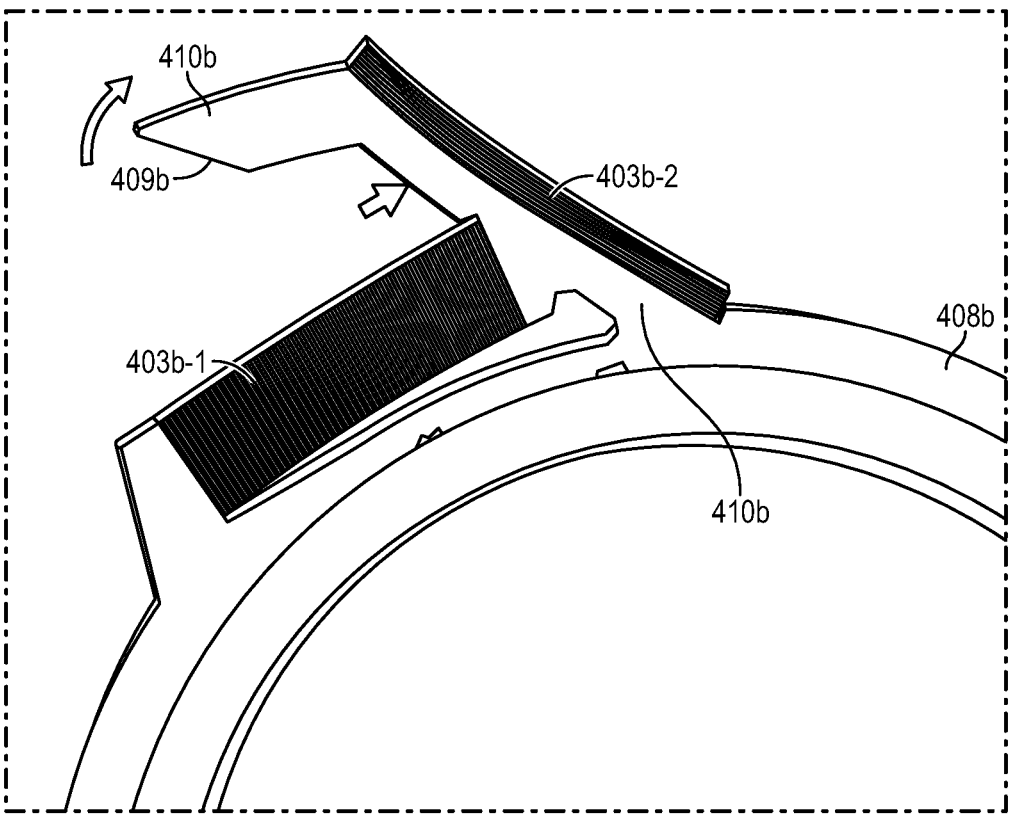
FIG. 4D is a side view illustrating the dual-motor locking mechanism of FIG. 4C in an actuated state, according to an embodiment.

FIG. 4C is a plan view illustrating a piezoelectric-based dual-motor actuator arm locking mechanism, and FIG. 4D is a side view illustrating the dual-motor locking mechanism of FIG. 4C in an actuated state, both according to embodiments. Thus, FIGS. 4C-4D collectively illustrate a dual-motor lock/unlock mechanism, which unlocks to allow a head-stack assembly (HSA) (e.g., actuator arm, suspension, read-write head, etc.) to translate vertically when piezoelectric-based actuators (or "motors") are actuated.

A piezoelectric-based locking mechanism 400b comprises a piezoelectric linear actuator 403b-1 and a piezoelectric bending actuator 403b-2 coupled to a support feature, such that actuation of the actuators 403b-1, 403b-2 can be implemented to either lock or unlock the locking mechanism 400b relative to the support feature. For context and as with FIGS. 4A-4B, a reduced-head hard disk drive (HDD) in which this embodiment may be implemented further comprises an actuator assembly comprising a voice coil (coil not shown here), a coil support structure 406b, and an actuator arm 408b, and some form of actuator elevator assembly configured to move the actuator assembly along at least one support feature to access at least two disk media of a disk stack (not shown here). For example, the aforementioned ball screw cam assembly or movable platform may function as a suitable actuator elevator assembly, according to embodiments.

According to an embodiment, the support feature comprises a slider structure 404b constituent to or coupled with the coil support structure 406b, and comprising a slider surface 405b movably mating with a surface 409b of the actuator arm 408b, and along which the actuator arm 408b moves to access various disk media. For example, the actuator assembly translates or elevates along the slider structure 404b, such as vertically in the scenario in which the slider structure 404b is positioned vertically. As introduced, the locking mechanism 400b comprises a piezoelectric linear actuator 403b-1, which is configured to contract and expand linearly (e.g., according to the orientation of the polarity and electric field of the piezoelectric material layers), and a piezoelectric bending actuator 403b-2, which is configured to contract and expand (e.g., according to the orientation of the polarity and electric field of the piezoelectric material layers) to bend a lock arm 410b extending from the main actuator arm 408b. Each of the linear actuator 403b-1 and the bending actuator 403b-2 is coupled with (e.g., bonded to) the lock arm 410b extending from the main actuator arm 408b, with each actuator 403b-1, 403b-2 configured and positioned to deflect the lock arm 410b (e.g., as depicted by block arrows) and thereby release the surface 409b of the lock arm 410b from contact with the slider surface 405b of the slider structure 404b in response to actuation of the actuators 403b-1, 403b-2. Once the surfaces 405b/409b are released from the friction with each other, the actuator assembly is free to translate along the slider structure 404b under the driving force of the actuator elevator assembly.

This arrangement is such that the linear actuator 403b-1 initially bends the lock arm 410b utilizing high leverage geometry to initiate a high slope on the end of the lock arm 410b, where the bending actuator 403b-2 is located. The bending actuator 403b-2 continues deflecting the end of the lock arm 410b at its end that contacts the slider structure 404b of the coil support structure 406b, which is all to release the surface 409b from the surface 405b. In comparison with the embodiments in reference to FIGS. 4A-4B, the linear actuator 403b-1 is oriented differently, e.g., at a 30° angle, to maximize the actuator height. Similarly, the bending actuator 403b-2 and the lock arm 410b are also oriented differently, e.g., rotated 24°, to maximize the actuator length.

Figure 4E:
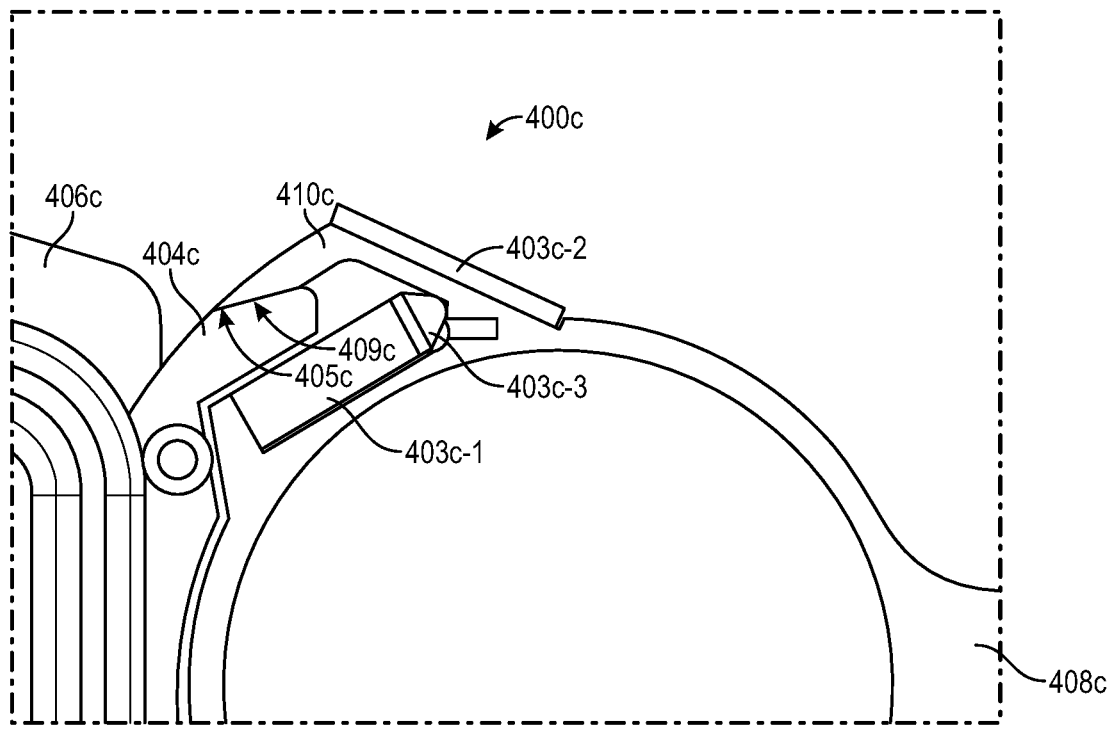
FIG. 4E is a plan view illustrating a piezoelectric-based dual-motor capped actuator arm locking mechanism, according to an embodiment.
Figure 4F:
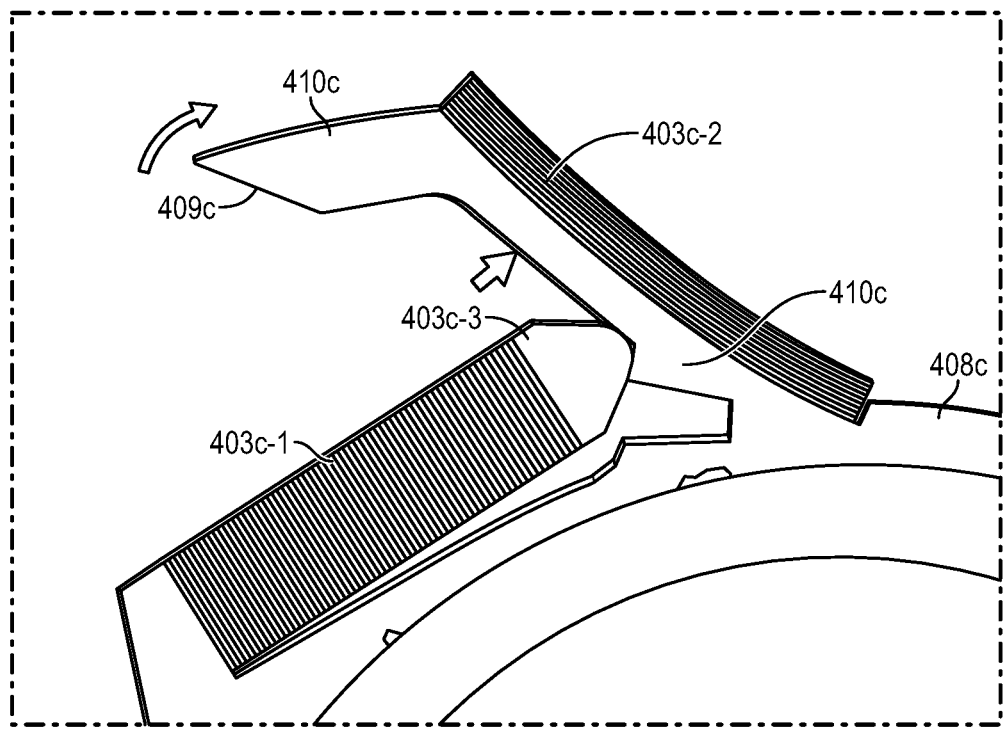
FIG. 4F is a side view illustrating the dual-motor capped locking mechanism of FIG. 4E in an actuated state, according to an embodiment.

FIG. 4E is a plan view illustrating a piezoelectric-based dual-motor capped actuator arm locking mechanism, and FIG. 4F is a side view illustrating the dual-motor capped locking mechanism of FIG. 4E in an actuated state, both according to embodiments. Thus, FIGS. 4E-4F collectively illustrate a dual-motor capped lock/unlock mechanism, which unlocks to allow a head-stack assembly (HSA) (e.g., actuator arm, suspension, read-write head, etc.) to translate vertically when piezoelectric-based actuators (or "motors") are actuated.

A piezoelectric-based locking mechanism 400c comprises a piezoelectric linear actuator 403c-1 and a piezoelectric bending actuator 403c-2 coupled to a support feature, such that actuation of the actuators 403c-1, 403c-2 can be implemented to either lock or unlock the locking mechanism 400c relative to the support feature. For context and as with FIGS. 4A-4B, a reduced-head hard disk drive (HDD) in which this embodiment may be implemented further comprises an actuator assembly comprising a voice coil (coil not shown here), a coil support structure 406c, and an actuator arm 408c, and some form of actuator elevator assembly configured to move the actuator assembly along at least one support feature to access at least two disk media of a disk stack (not shown here). For example, the aforementioned ball screw cam assembly or movable platform may function as a suitable actuator elevator assembly, according to embodiments.

According to an embodiment, the support feature comprises a slider structure 404c constituent to or coupled with the coil support structure 406c, and comprising a slider surface 405c movably mating with a surface 409c of the actuator arm 408c, and along which the actuator arm 408c moves to access various disk media. For example, the actuator assembly translates or elevates along the slider structure 404c, such as vertically in the scenario in which the slider structure 404c is positioned vertically. As introduced, the locking mechanism 400c comprises a piezoelectric linear actuator 403c-1, which is configured to contract and expand linearly (e.g., according to the orientation of the polarity and electric field of the piezoelectric material layers), and a piezoelectric bending actuator 403c-2, which is configured to contract and expand (e.g., according to the orientation of the polarity and electric field of the piezoelectric material layers) to bend a lock arm 410c extending from the main actuator arm 408c. Each of the linear actuator 403c-1 and the bending actuator 403c-2 is coupled with (e.g., bonded to) the lock arm 410c extending from the main actuator arm 408c, with each actuator 403c-1, 403c-2 configured and positioned to deflect the lock arm 410c (e.g., as depicted by block arrows) and thereby release the surface 409c of the lock arm 410c from contact with the slider surface 405c of the slider structure 404c in response to actuation of the actuators 403c-1, 403c-2. Once the surfaces 405c/409c are released from the friction with each other, the actuator assembly is free to translate along the slider structure 404c under the driving force of the actuator elevator assembly.

This arrangement is such that the linear actuator 403c-1 initially bends the lock arm 410c utilizing high leverage geometry to initiate a high slope on the end of the lock arm 410c, where the bending actuator 403c-2 is located. The bending actuator 403c-2 continues deflecting the end of the lock arm 410c at its end that contacts the slider structure 404c of the coil support structure 406c, which is all to release the surface 409c from the surface 405c. In comparison with the embodiments in reference to FIGS. 4C-4D, locking mechanism 400c further comprises a cap 403c-3, coupled with the linear actuator 403c-1, which is not fixed to the lock arm 410c. That is, when a piezoelectric actuator is mounted to a flat face on each end, slight misalignments among the faces can produce edge squeezing and localized high pressures, which can damage the actuator. Thus, the cap 403c-3 on the end of the linear actuator 403c-1 is in sliding contact with surfaces of the lock arm 410c and ultimately allows the lock arm 410c to more freely bend and its end to more readily deflect. According to an embodiment, the cap 403c-3 is a ceramic cap having a radius surface at its end.

Figure 4G:
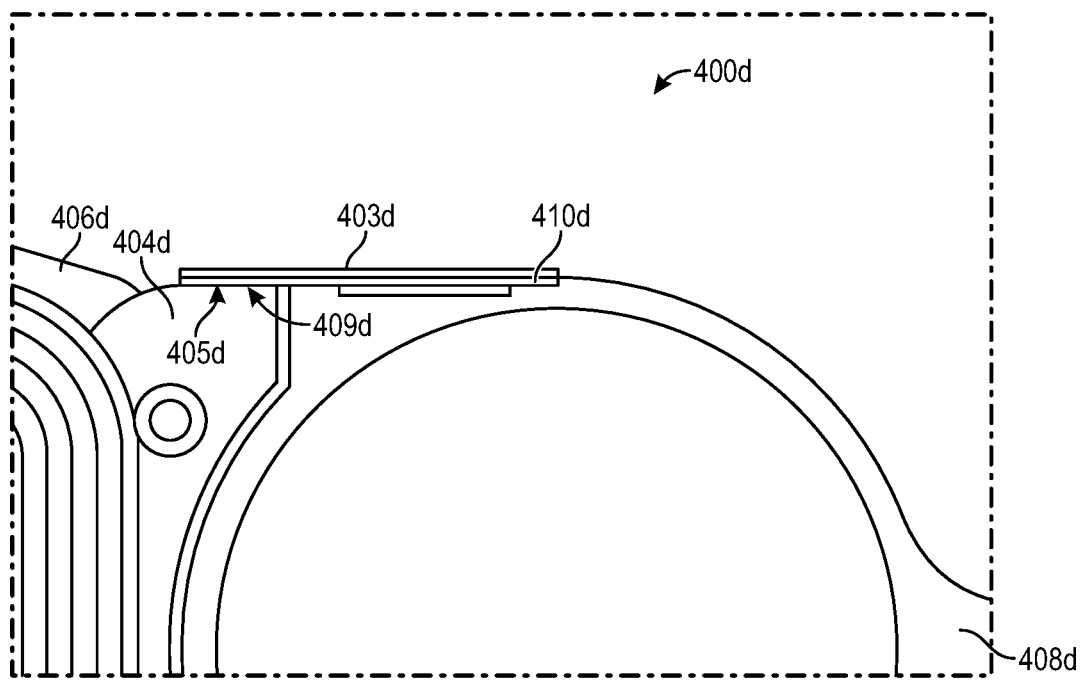
FIG. 4G is a plan view illustrating a piezoelectric-based single-motor actuator arm locking mechanism, according to an embodiment.
Figure 4H:
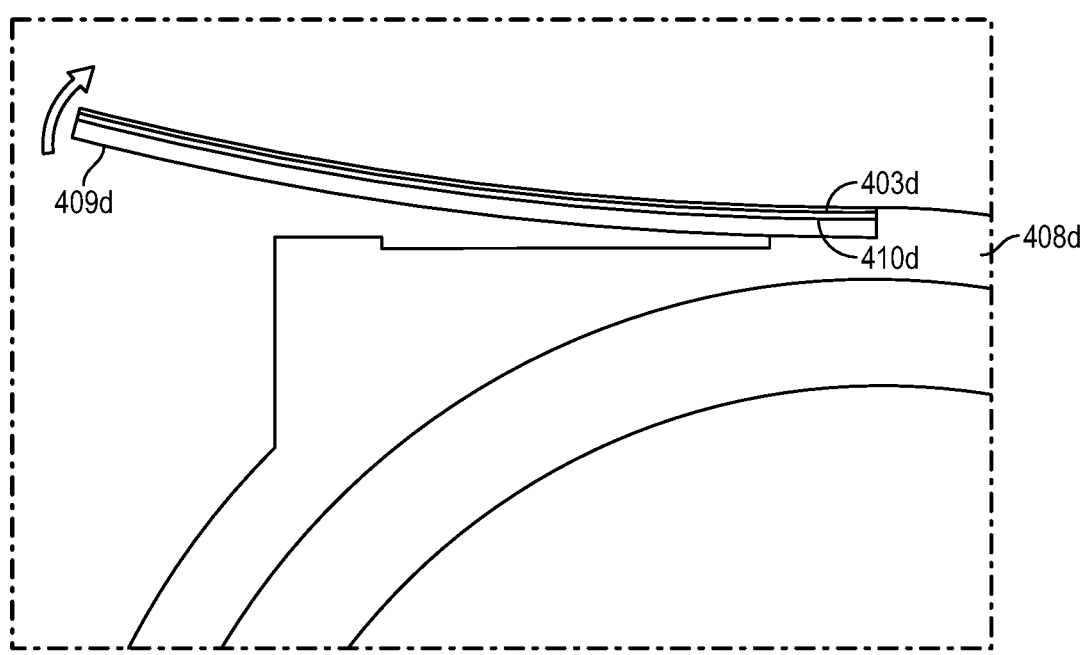
FIG. 4H is a side view illustrating the single-motor locking mechanism of FIG. 4G in an actuated state, according to an embodiment.

FIG. 4G is a plan view illustrating a piezoelectric-based single-motor actuator arm locking mechanism, according to an embodiment, and FIG. 4H is a side view illustrating the single-motor locking mechanism of FIG. 4G in an actuated state, both according to embodiments. Thus, FIGS. 4G-4H collectively illustrate a single-motor lock/unlock mechanism, which unlocks to allow a head-stack assembly (HSA) (e.g., actuator arm, suspension, read-write head, etc.) to translate vertically when piezoelectric-based actuators (or "motors") are actuated.

A piezoelectric-based locking mechanism 400d comprises a piezoelectric bending actuator 403d coupled to a support feature, such that actuation of the actuator 403d can be implemented to either lock or unlock the locking mechanism 400d relative to the support feature. For context and as with FIGS. 4A-4B, a reduced-head hard disk drive (HDD) in which this embodiment may be implemented further comprises an actuator assembly comprising a voice coil (coil not shown here), a coil support structure 406d, and an actuator arm 408d, and some form of actuator elevator assembly configured to move the actuator assembly along at least one support feature to access at least two disk media of a disk stack (not shown here). For example, the aforementioned ball screw cam assembly or movable platform may function as a suitable actuator elevator assembly, according to embodiments.

According to an embodiment, the support feature comprises a slider structure 404d constituent to or coupled with the coil support structure 406d, and comprising a slider surface 405d movably mating with a surface 409d of the actuator arm 408d, and along which the actuator arm 408d moves to access various disk media. For example, the actuator assembly translates or elevates along the slider structure 404d, such as vertically in the scenario in which the slider structure 404d is positioned vertically. As introduced, the locking mechanism 400d comprises a piezoelectric bending actuator 403d, which is configured to contract and expand (e.g., according to the orientation of the polarity and electric field of the piezoelectric material layers) to bend a lock arm 410d extending from the main actuator arm 408d. The bending actuator 403d is coupled with (e.g., bonded to) the lock arm 410d (at a proximal end) extending from the main actuator arm 408d, with actuator 403d configured and positioned to deflect the lock arm 410d (e.g., as depicted by block arrows) and thereby release the distal surface 409d of the lock arm 410d from contact with the slider surface 405d of the slider structure 404d in response to actuation of the actuator 403d. Once the surfaces 405d/409d are released from the friction with each other, the actuator assembly is free to translate along the slider structure 404d under the driving force of the actuator elevator assembly.

Piezoelectric-Based Actuator Platform Elevator Locking Mechanisms

Figure 5A:
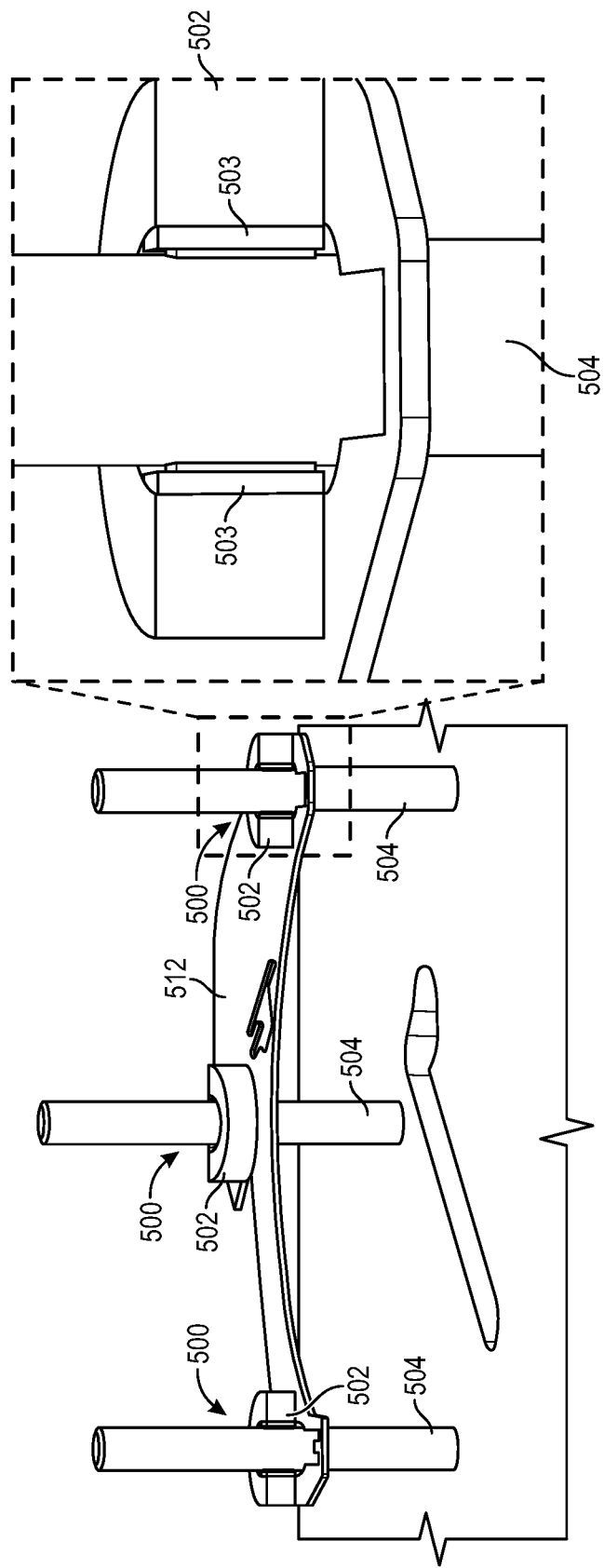
FIG. 5A is a perspective view illustrating a piezoelectric-based actuator arm platform elevator locking mechanism, according to an embodiment.
Figure 5B:
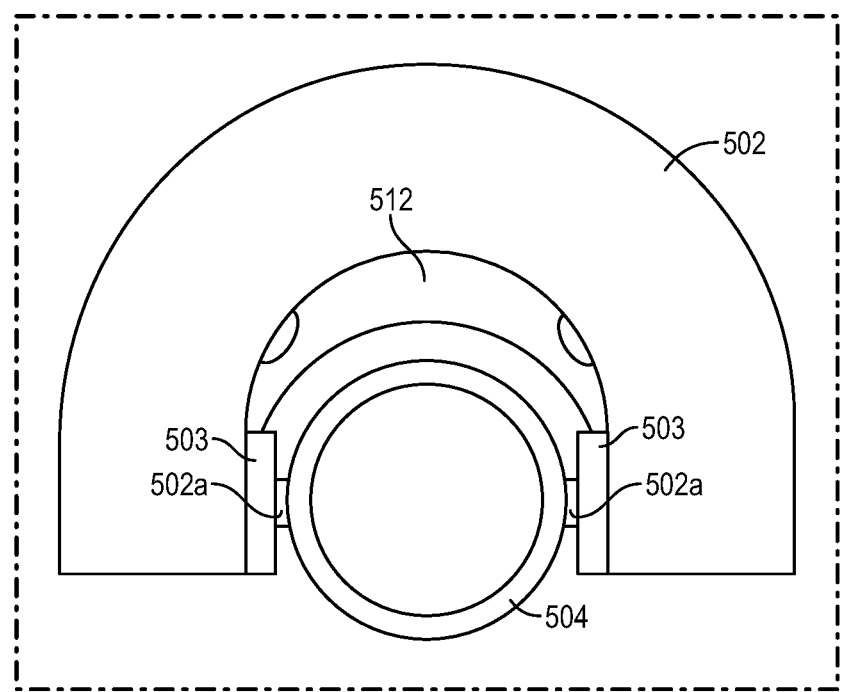
FIG. 5B is a plan view illustrating the platform elevator locking mechanism of FIG. 5A, according to an embodiment.

FIG. 5A is a perspective view illustrating a piezoelectric-based actuator arm platform elevator locking mechanism, and FIG. 5B is a plan view illustrating the platform elevator locking mechanism of FIG. 5A, both according to embodiments. Thus, FIGS. 5A-5B collectively illustrate a shaft-clamp-style platform lock/unlock mechanism, which unlocks to allow a platform elevator housing at least a head-stack assembly (HSA) (e.g., actuator arm, suspension, read-write head, etc.) to translate vertically when piezoelectric-based actuators (or "motors") are actuated.

A piezoelectric-based locking mechanism 500 comprises a plurality of piezoelectric actuator locking mechanisms movably coupled to a support feature, such that actuation of the actuator locking mechanisms can be implemented to either lock or unlock the locking mechanism 500 relative to the support feature. For context, a reduced-head hard disk drive (HDD) in which this embodiment may be implemented further comprises an actuator assembly comprising a voice coil (see, e.g., coil 140 of FIG. 1), a coil support structure (see, e.g., armature 136 of FIG. 1), and an actuator arm (see, e.g., arm 132 of FIG. 1), and some form of actuator elevator assembly configured to move the actuator assembly along at least one support feature to access at least two disk media of a disk stack (see, e.g., recording medium 120 of FIG. 1). For example, the aforementioned movable platform may function as a suitable actuator elevator assembly, according to embodiments.

According to an embodiment, the support feature comprises a plurality of shafts 504 supporting an elevator platform 512, along with which the actuator assembly moves to access various disk media. For example, the actuator assembly is mounted to and translates or elevates along with the platform 512 along the axes of the shafts 504, such as vertically in the scenario in which the shafts 504 are positioned vertically. According to a related embodiment, the locking mechanism 500 comprises a plurality of C-shaped clamps 502 fixed to the platform 512 and movably/slidably coupled with a respective corresponding shaft 504, and positioned around at least part of the corresponding shaft 504, where each C-shaped clamp 502 comprises the at least one piezoelectric actuator 503 which is positioned to open the clamp 502 in response to actuation of the actuator 503. Once the clamps 502 are opened and released from the friction with the corresponding shafts 504, the platform 512 is free to translate along the shafts 504 under the driving force of the actuator elevator assembly. While this embodiment is described as expanding when actuated, thus opening the clamp 502 in which the piezoelectric actuator 503 is "embedded", the piezoelectric actuator 503 could be reversely configured to be open when at rest with no electricity applied and, therefore, close the clamp 502 when actuated, based on implementation requirements/goals.

According to an embodiment, each of the plurality of clamps 502 further comprises a corresponding pad 502a coupled with each piezoelectric actuator 503, and disposed between and providing a mechanical interface (e.g., frictional) between a corresponding actuator 503 and the shaft 504. The pads 502a may be preloaded via a spring if desired. Furthermore, the number of piezoelectric actuators 503 per clamp 502 may vary from implementation (e.g., based on cost, design goals and requirements, and the like) and, therefore, are not limited to the number shown.

Figure 5E:
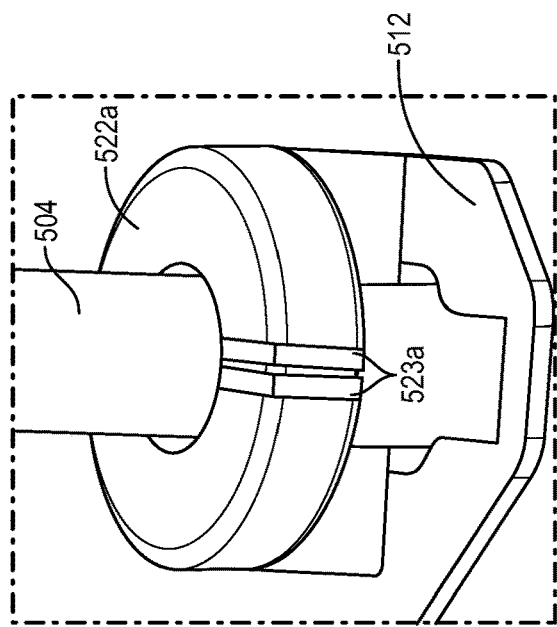
FIG. 5E is a perspective view illustrating an alternative piezo configuration for the platform elevator locking mechanism of FIG. 5C, according to an embodiment.
Figure 5F:
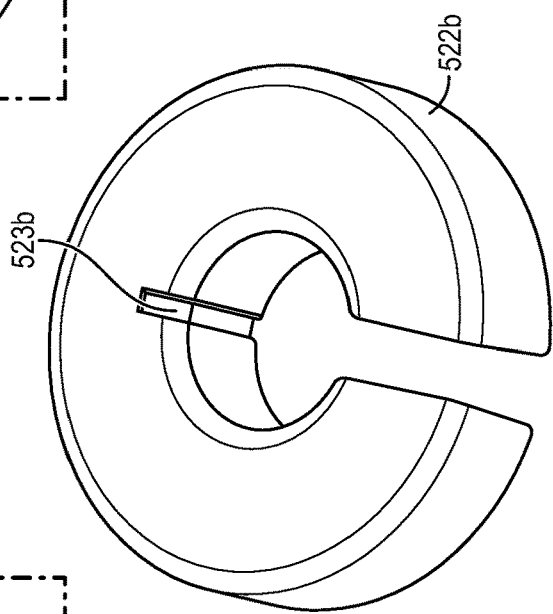
FIG. 5F is a perspective view illustrating an alternative piezo configuration for the platform elevator locking mechanism of FIG. 5C, according to an embodiment.
Figure 5D:
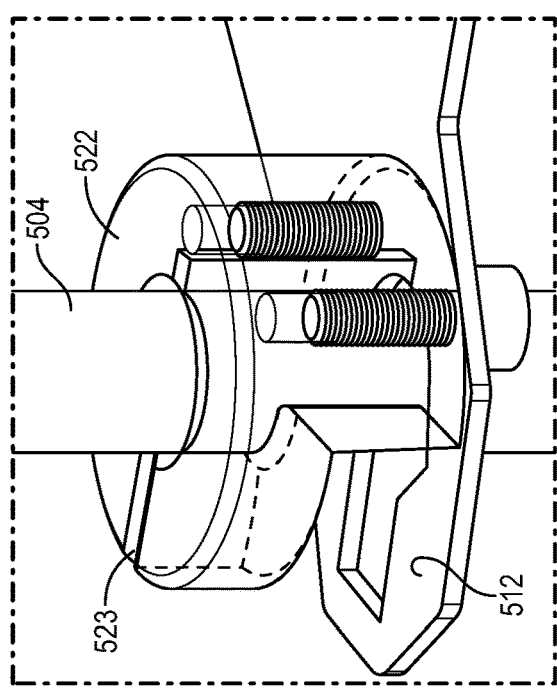
FIG. 5D is a perspective view illustrating a mounting configuration for the platform elevator locking mechanism of FIG. 5C, according to an embodiment.

FIG. 5C is a perspective view illustrating a piezoelectric-based actuator arm platform elevator locking mechanism, and FIG. 5D is a perspective view illustrating a mounting configuration for the platform elevator locking mechanism of FIG. 5C, both according to embodiments. Thus, FIGS. 5C-5D collectively illustrate a shaft-clamp-style platform lock/unlock mechanism, which unlocks to allow a platform elevator housing at least a head-stack assembly (HSA) (e.g., actuator arm, suspension, read-write head, etc.) to translate vertically when piezoelectric-based actuators (or "motors") are actuated.

A piezoelectric-based locking mechanism 520 comprises a plurality of piezoelectric actuator locking mechanisms movably coupled to a support feature, such that actuation of the actuator locking mechanisms can be implemented to either lock or unlock the locking mechanism 520 relative to the support feature. For context and similarly to FIGS. 5A-5B, a reduced-head hard disk drive (HDD) in which this embodiment may be implemented further comprises an actuator assembly comprising a voice coil, a coil support structure, and an actuator arm, and some form of actuator elevator assembly configured to move the actuator assembly along at least one support feature to access at least two disk media of a disk stack. For example, the aforementioned movable platform may function as a suitable actuator elevator assembly, according to embodiments.

According to an embodiment, the locking mechanism 520 comprises a plurality of collars 522 fixed to the platform 512 and movably/slidably coupled with a respective corresponding shaft 504, and positioned around at least part of the corresponding shaft 504, where each collar 522 comprises the at least one piezoelectric actuator 523 which is positioned to open the collar 522 in response to actuation of the actuator 523. Once the collars 522 are opened and released from the friction with the corresponding shafts 504, the platform 512 is free to translate along the shafts 504 under the driving force of the actuator elevator assembly. While this embodiment is described as expanding when actuated, thus opening the collar 522 in which the piezoelectric actuator 523 is "embedded", the piezoelectric actuator 523 could be reversely configured to be open when at rest with no electricity applied and, therefore, close the collar 522 when actuated, based on implementation requirements/goals. The number of piezoelectric actuators 523 per collar 522 may vary from implementation (e.g., based on cost, design goals and requirements, and the like) and, therefore, are not limited to the number shown.

FIG. 5E is a perspective view illustrating an alternative piezo configuration for the platform elevator locking mechanism of FIG. 5C, according to an embodiment, in which collar 522a comprises a dual-motor configuration comprising two piezoelectric actuators 523a. FIG. 5F is a perspective view illustrating another alternative piezo configuration for the platform elevator locking mechanism of FIG. 5C, according to an embodiment, in which collar 522b comprises a single-motor configuration comprising a single piezoelectric actuator 523b embedded within an inner diameter position of the collar 522b.

Figure 6A:
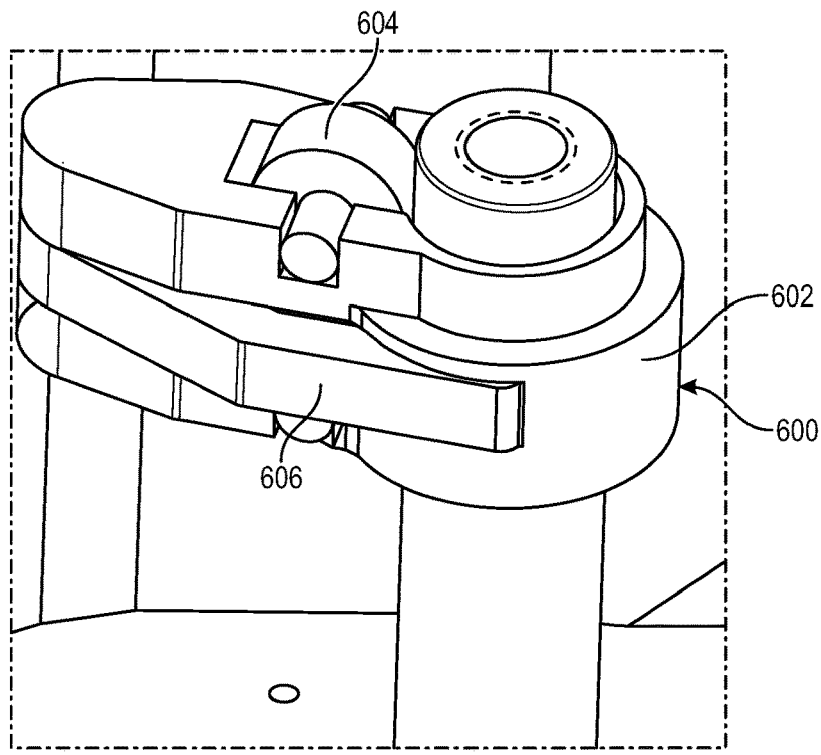
FIG. 6A is a perspective view illustrating a piezoelectric-based actuator arm platform elevator locking mechanism, according to an embodiment.
Figure 6B:
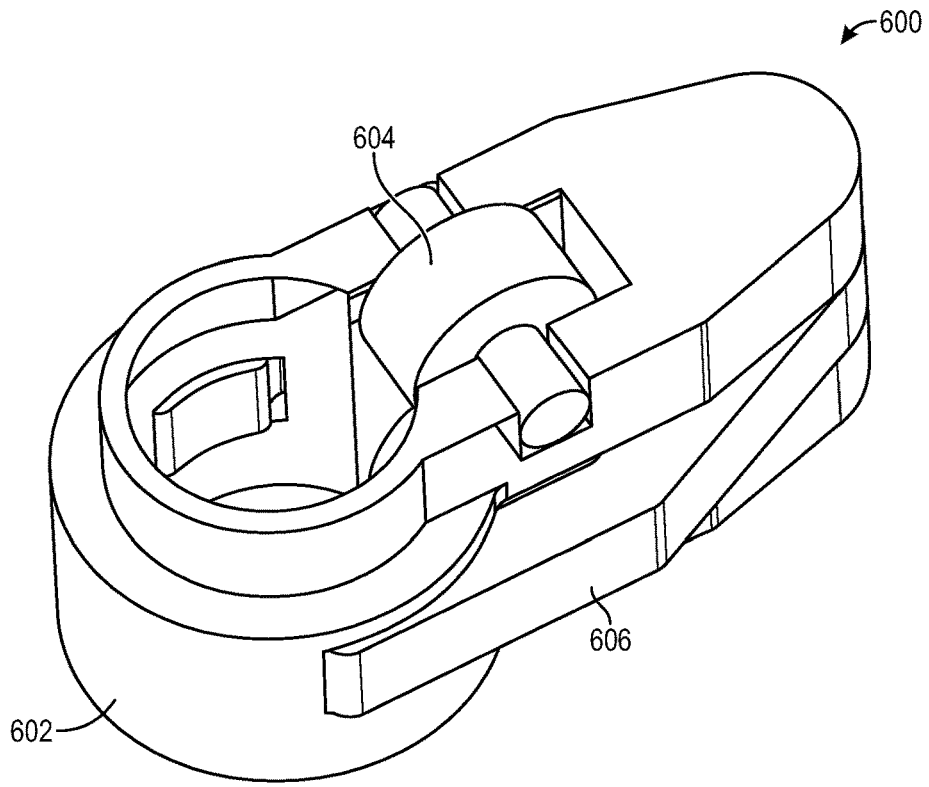
FIG. 6B is a perspective view illustrating the platform elevator locking mechanism of FIG. 6A, according to an embodiment.
Figure 6C:
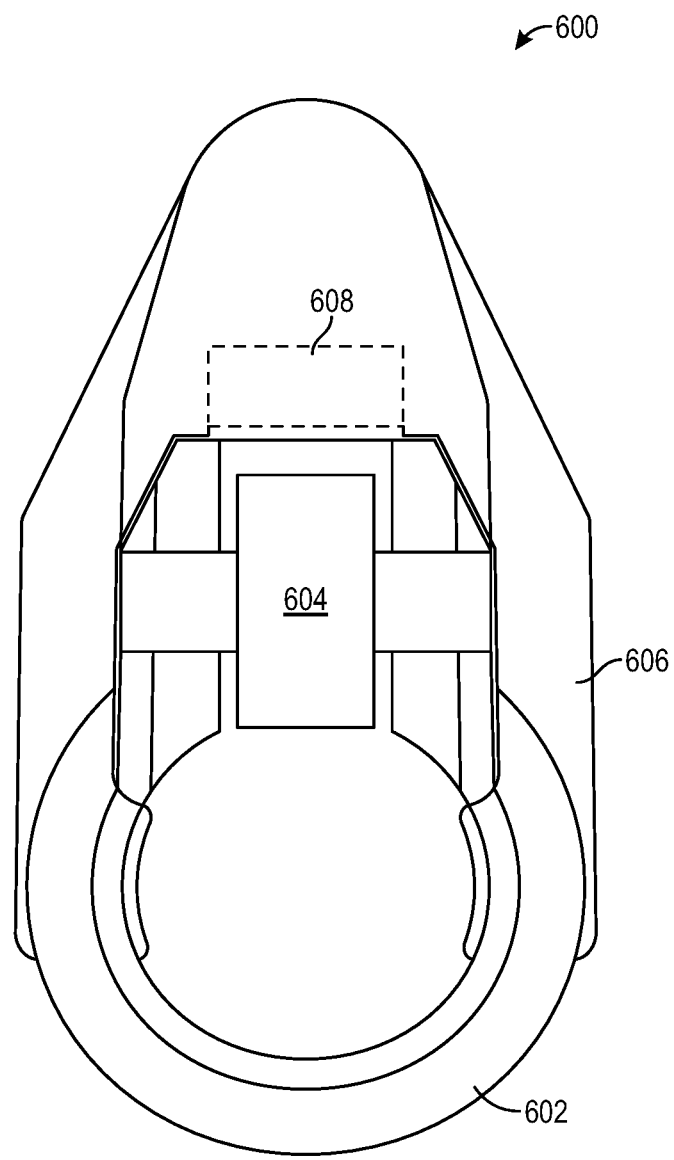
FIG. 6C is a plan view illustrating the platform elevator locking mechanism of FIG. 6A, according to an embodiment.
Figure 6D:
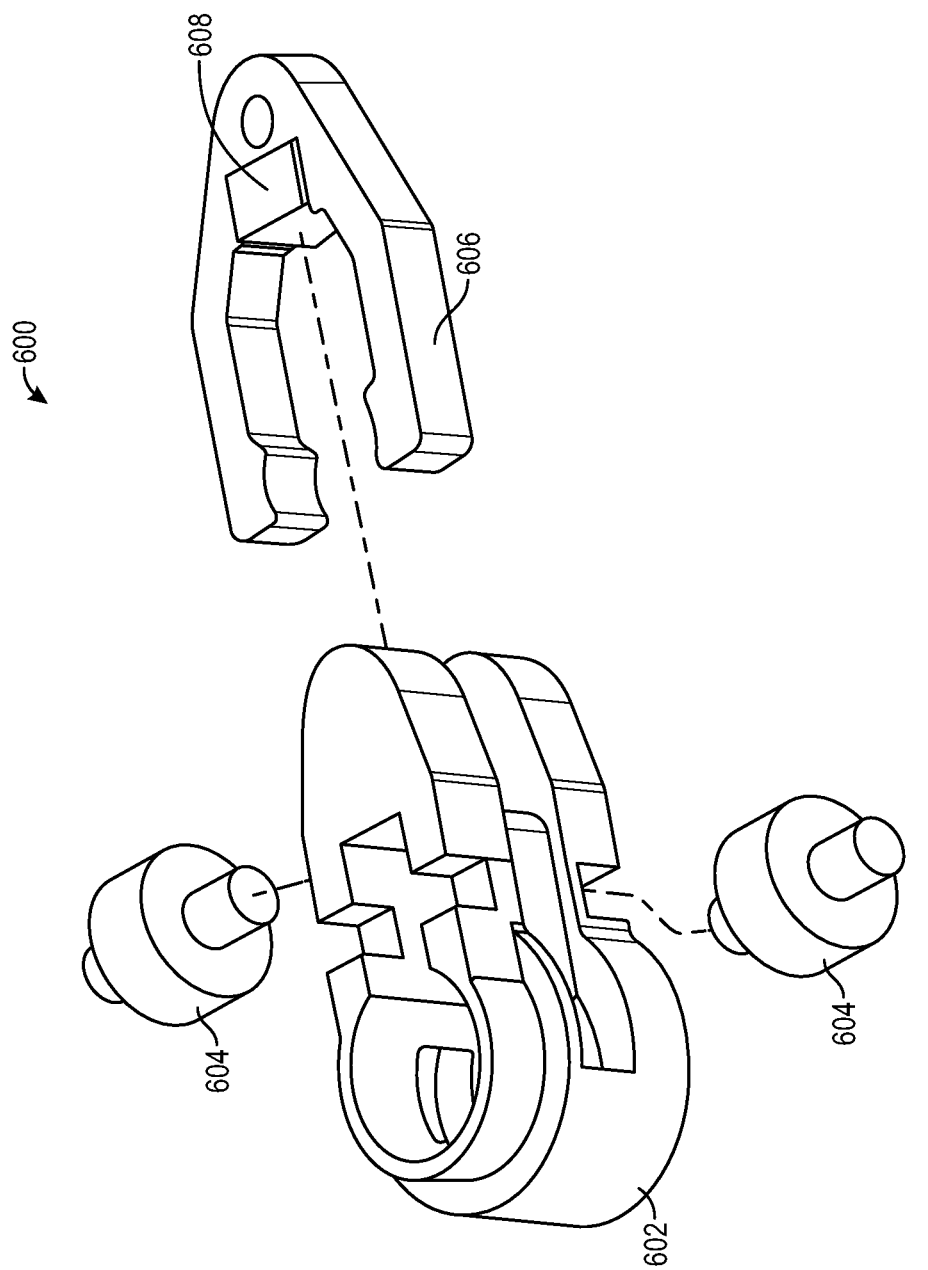
FIG. 6D is an exploded view illustrating the platform elevator locking mechanism of FIG. 6A, according to an embodiment.

Piezoelectric-Based Actuator Platform Elevator Locking Mechanism with Roller Bearing FIG. 6A is a perspective view illustrating a piezoelectric-based actuator arm platform elevator locking mechanism, FIG. 6B is a perspective view illustrating the platform elevator locking mechanism of FIG. 6A, FIG. 6C is a plan view illustrating the platform elevator locking mechanism of FIG. 6A, and FIG. 6D is an exploded view illustrating the platform elevator locking mechanism of FIG. 6A, all according to embodiments. Thus, FIGS. 6A-6D collectively illustrate a shaft-clamp-roller-style platform lock/unlock mechanism, which unlocks to allow a platform elevator housing at least a head-stack assembly (HSA) (e.g., actuator arm, suspension, read-write head, etc.) to translate vertically when piezoelectric-based actuators (or "motors") are actuated.

A piezoelectric-based locking mechanism comprises a plurality of piezoelectric actuator locking mechanisms movably coupled to a support feature, such that actuation of the actuator locking mechanisms can be implemented to either lock or unlock the locking mechanism relative to the support feature. For context, a reduced-head hard disk drive (HDD) in which this embodiment may be implemented further comprises an actuator assembly comprising a voice coil (see, e.g., coil 140 of FIG. 1), a coil support structure (see, e.g., armature 136 of FIG. 1), and an actuator arm (see, e.g., arm 132 of FIG. 1), and some form of actuator elevator assembly configured to move the actuator assembly along at least one support feature to access at least two disk media of a disk stack (see, e.g., recording medium 120 of FIG. 1). For example, the aforementioned movable platform may function as a suitable actuator elevator assembly, according to embodiments.

According to an embodiment, the support feature comprises a plurality of shafts 504 supporting an elevator platform 512 (see, e.g., FIGS. 5A, 5C), along with which the actuator assembly moves to access various disk media. For example, the actuator assembly is mounted to and translates or elevates along with the platform 512 along the axes of the shafts 504, such as vertically in the scenario in which the shafts 504 are positioned vertically. According to a related embodiment, the locking mechanism comprises a plurality of roller bearing clamp assemblies 600 fixed to the platform 512 and movably/slidably coupled with a respective corresponding shaft 504, and positioned around at least part of the corresponding shaft 504.

Each roller bearing clamp assembly 600 comprises the at least one piezoelectric actuator 608 which is positioned to open the roller bearing clamp assembly 600 in response to actuation of the actuator 608. Each roller bearing clamp assembly 600 further comprises a clamp body 602, at least one roller bearing 604 (preferably two as depicted), and a clamp 606 that is activated/deactivated via operation of the actuator 608. The clamp body 602 is configured to house the at least one roller bearing 604 and the clamp 606, and each roller bearing 604 (e.g., a ball bearing) is configured to mechanically interface with a corresponding shaft 504 to provide a bearing force/support for such interface while facilitating the translation of the roller bearing clamp assembly 600 and the platform 512 or other suitable actuator elevator assembly or sub-assembly. The clamp 606 (e.g., stainless steel) is configured to house the piezoelectric actuator 608, and to lock/unlock from a corresponding shaft 504 responsive to actuation of the actuator 608. Once the clamp assemblies 600 are opened and released from the friction with the corresponding shafts 504, the platform 512 is free to translate along the shafts 504 under the driving force of the actuator elevator assembly. While this embodiment is described as unlocked when actuated, thus opening the clamp 606 in which the piezoelectric actuator 608 is "embedded", the clamp 606 and piezoelectric actuator 608 could be reversely configured to be open when at rest with no electricity applied and, therefore, close the clamp 606 and clamp assembly 600 when actuated, based on implementation requirements/goals.

Method of Accessing a Plurality of Recording Disks in a Reduced-Head HDD

Figure 7:
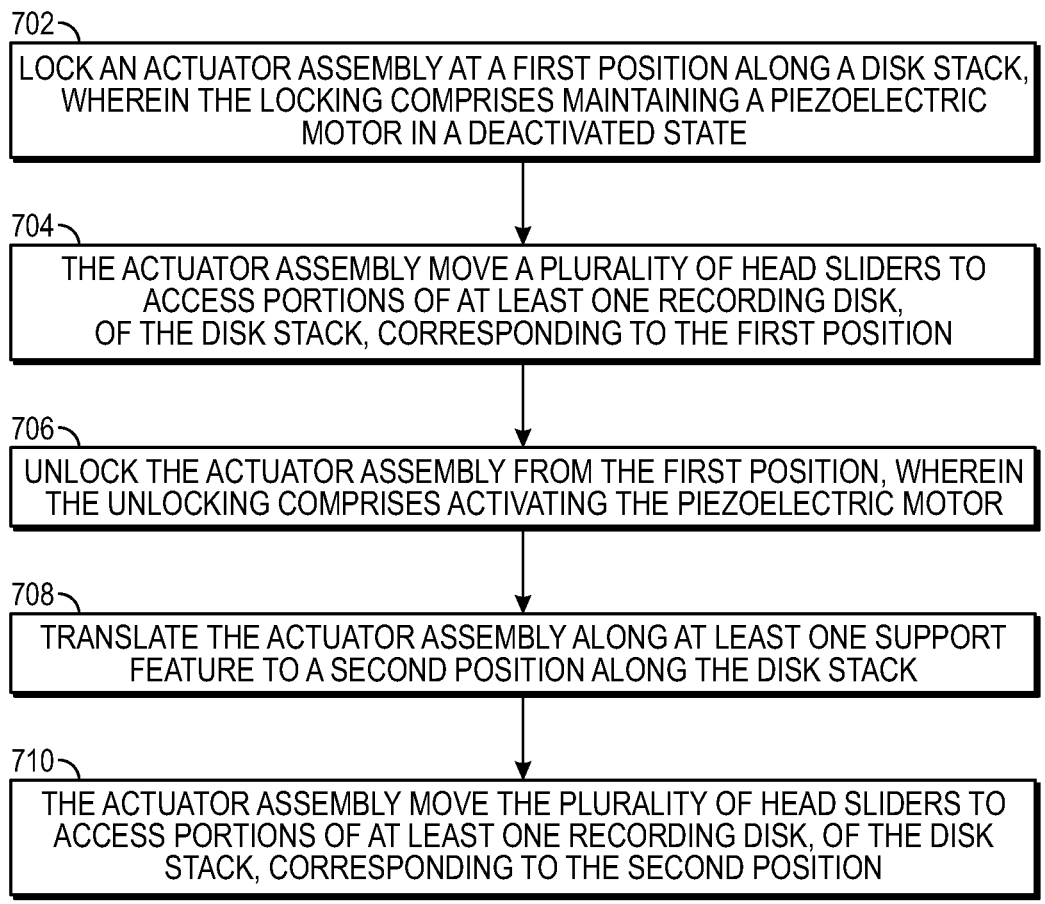
FIG. 7 is a flow diagram illustrating a method of accessing a plurality of recording disks in a reduced-head hard disk drive, according to an embodiment.

FIG. 7 is a flow diagram illustrating a method of accessing a plurality of recording disks in a reduced-head hard disk drive (HDD), according to an embodiment. That is, the method of FIG. 7 involves accessing a plurality of n recording disks of a disk stack, by a plurality of less than 2n head sliders of a head-stack assembly each comprising a read-write transducer configured to read from and to write to at least two disk media of the disk stack.

At block 702, an actuator assembly is locked at a first position along the disk stack, wherein the locking comprises maintaining a piezoelectric motor in a deactivated state. For example, any and all of the piezoelectric actuators of the piezoelectric-based locking mechanisms described herein in reference to FIGS. 2A-6D may be configured to movably couple with a corresponding support feature described herein in reference to FIGS. 2A-6D and to lock such locking mechanism relative to the support feature (e.g., in a deactivated/deactuated state), such that an actuator assembly comprising a voice coil (see, e.g., coil 140 of FIG. 1), a coil support structure (see, e.g., armature 136 of FIG. 1), and an actuator arm (see, e.g., arm 132 of FIG. 1), and some form of actuator elevator assembly configured to move the actuator assembly along at least one support feature, are temporarily locked in position.

At block 704, the actuator assembly moves the plurality of head sliders to access portions of at least one recording disk, of the disk stack, corresponding to the first position. Reference is made to FIG. 1 for a description of the operational capabilities of a conventional HDD, which may be applicable here in regard to accessing data on a recording disk.

At block 706, the actuator assembly is unlocked from the first position, wherein the unlocking comprises activating the piezoelectric motor. For example, any and all of the piezoelectric actuators of the piezoelectric-based locking mechanisms described herein in reference to FIGS. 2A-6D may be configured to unlock such locking mechanism relative to the support feature (e.g., in an activated/actuated state), such that the actuator assembly and actuator elevator assembly are temporarily unlocked from their locked position of block 702.

At block 708, the actuator assembly is translated along at least one support feature to a second position along the disk stack. For example, the aforereferenced ball screw cam assembly or movable platform may function as a suitable actuator elevator assembly for translating/elevating the actuator assembly, according to embodiments.

At block 710, the actuator assembly moves the plurality of head sliders to access portions of at least one recording disk, of the disk stack, corresponding to the second position. Again, reference is made to FIG. 1 for a description of the operational capabilities of a conventional HDD, which may be applicable here in regard to accessing data on a recording disk.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:
1. A hard disk drive (HDD) comprising:
a plurality of n recording disk media rotatably mounted on a spindle;
a plurality of less than 2n head sliders each comprising a read-write transducer configured to read from and to write to at least two disk media of the plurality of disk media;
an actuator assembly configured to move the plurality of head sliders to access portions of the at least two disk media, the actuator assembly comprising an actuator arm, a voice coil, and a coil support structure;
an actuator elevator assembly configured to move the actuator assembly along at least one support feature constituent to and extending from the coil support structure to access the at least two disk media; and
a piezoelectric-based locking mechanism comprising at least one piezoelectric actuator and movably coupled with the support feature such that actuation of the actuator either locks or unlocks the locking mechanism relative to the support feature.

2. The HDD of claim 1, wherein:
the at least one support feature comprises a shaft coupled with the coil support structure and along which the actuator arm moves to access the disk media; and
the locking mechanism comprises a C-shaped or U-shaped clamp coupled with the actuator arm and positioned around at least part of the shaft and comprising the at least one piezoelectric actuator positioned to open the clamp responsive to actuation of the at least one actuator.

3. The HDD of claim 1, wherein:
the at least one support feature comprises a slider structure coupled with the coil support structure and a slider surface movably mating with a surface of the actuator arm and along which the actuator arm slides to access the disk media; and
the locking mechanism comprises the at least one piezoelectric actuator coupled with the actuator arm and positioned to release the surface of the actuator arm from contact with the slider surface responsive to actuation of the at least one actuator.

4. The HDD of claim 3, wherein the at least one piezoelectric actuator comprises a linear actuator and a bending actuator operating together to release the surface of the actuator arm from contact with the slider surface.

5. The HDD of claim 3, wherein:
the at least one piezoelectric actuator comprises a linear actuator and a bending actuator operating together to release the surface of the actuator arm from contact with the slider surface; and
the locking mechanism further comprises a cap coupled with the linear actuator and in sliding contact with the actuator arm.

6. The HDD of claim 3, wherein:
the locking mechanism further comprises a lock arm coupled with the actuator arm;
the at least one piezoelectric actuator comprises a bending actuator coupled with the lock arm and configured to release the surface of the actuator arm from contact with the slider surface.

7. The HDD of claim 6, wherein the lock arm comprises a proximal end bonded to the actuator arm and a distal portion in sliding contact with the slider surface.

8. The HDD of claim 1, wherein the actuator elevator assembly comprises a ball screw and a motor disposed within the ball screw.

9. The HDD of claim 1, wherein:
the actuator elevator assembly comprises a platform housing the actuator assembly, supported by and translating along a plurality of shafts; and
the locking mechanism comprises a plurality of C-shaped clamps fixed to the elevator assembly and each positioned around at least part of a corresponding shaft of the plurality of shafts and each comprising a corresponding piezoelectric actuator of the at least one piezoelectric actuator positioned to open a corresponding clamp of the plurality of clamps responsive to actuation of the corresponding actuator.

10. The HDD of claim 9, wherein each of the plurality of clamps further comprises a corresponding pad coupled with each piezoelectric actuator and disposed between, and providing a mechanical interface between, the corresponding shaft and the corresponding piezoelectric actuator.

11. The HDD of claim 9, wherein each of the plurality of clamps further comprises a corresponding collar fixed to the platform.

12. The HDD of claim 1, wherein:
the actuator elevator assembly comprises a platform housing the actuator assembly, supported by and translating along a plurality of shafts;
the locking mechanism comprises a plurality of clamp assemblies each positioned around a corresponding shaft of the plurality of shafts and each comprising a corresponding piezoelectric actuator of the at least one piezoelectric actuator positioned to open a corresponding clamp assembly of the plurality of clamp assemblies responsive to actuation of the corresponding actuator; and
each clamp assembly comprises:
a clamp body,
at least one roller bearing,
a clamp, and
the corresponding piezoelectric actuator.

13. A method of accessing a plurality of n recording disks of a disk stack, by a plurality of less than 2n head sliders of a head-stack assembly each comprising a read-write transducer configured to read from and to write to at least two disk media of the disk stack, the method comprising:
locking an actuator assembly to at least one support feature at a first position along the disk stack, wherein the locking comprises maintaining a piezoelectric motor in a deactivated state;
wherein the at least one support feature comprises a slider structure coupled with a static coil support structure of the actuator assembly and comprising a slider surface mating with a slidable surface of a free end of a lock arm affixed at one end to and extending from an actuator arm of the actuator assembly to the opposing free end, and along which the actuator arm translates from the first position to a second position;
the actuator assembly moving the plurality of head sliders to access portions of at least one recording disk, of the disk stack, corresponding to the first position;
unlocking the actuator assembly from the first position, wherein the unlocking comprises activating the piezoelectric motor coupled with the lock arm and positioned to release the slidable surface of the lock arm from contact with the slider surface of the slider structure by bending the free end of the lock arm away from the slider surface;
translating the actuator assembly along at least one support feature to the second position along the disk stack; and
the actuator assembly moving the plurality of head sliders to access portions of at least one recording disk, of the disk stack, corresponding to the second position.

14. The method of claim 13, wherein:
the at least one support feature comprises a shaft coupled with a static coil support structure of the actuator assembly and along which an actuator arm of the actuator assembly translates from the first position to the second position; and the unlocking comprises activating the piezoelectric motor constituent to and positioned to open a C-shaped or U-shaped clamp coupled with the actuator arm and positioned around at least a portion of the shaft.

15. The method of claim 13, wherein:
the translating comprises translating a platform housing the actuator assembly, supported by and translating along a plurality of shafts; and
the unlocking comprises activating each of a plurality of piezoelectric motors each constituent to and positioned to open a corresponding C-shaped clamp fixed to the platform, wherein each clamp is positioned around at least part of a corresponding shaft of the plurality of shafts.

16. The method of claim 13, wherein:
the translating comprises translating a platform housing the actuator assembly, supported by and translating along a plurality of shafts; and
the unlocking comprises activating each of a plurality of piezoelectric motors each constituent to and positioned to open a corresponding roller bearing clamp assembly fixed to the platform, wherein each roller bearing clamp assembly is positioned around a corresponding shaft of the plurality of shafts; and
each roller bearing clamp assembly further comprises a clamp body, at least one roller bearing, and a clamp.

17. A system comprising:
means for locking an actuator assembly, at a first position along a recording disk stack, to at least one support feature comprising a slider surface mating with a slidable surface of a free end of a lock arm extending from an actuator arm of the actuator assembly, including means for maintaining a piezoelectric device coupled with the lock arm in a deactivated state;
means for moving the plurality of head sliders to access portions of at least one recording disk of the disk stack corresponding to the first position;
means for unlocking the actuator assembly from the first position, including means for activating the piezoelectric device to release the slidable surface from contact with the slider surface by bending the free end of the lock arm away from the slider surface;
means for translating the actuator assembly along at least one support feature to a second position along the disk stack; and
means for moving the plurality of head sliders to access portions of at least one recording disk of the disk stack corresponding to the second position.

\* \* \* \* \*